US012012293B1

(12) United States Patent
Little et al.

(10) Patent No.: US 12,012,293 B1
(45) Date of Patent: Jun. 18, 2024

(54) SYSTEMS AND PROCESSES FOR SELECTING AND PACKING ARTICLES

(71) Applicant: Hallmark Cards, Incorporated, Kansas City, MO (US)

(72) Inventors: Gerald Little, Kansas City, MO (US); Robert F. McAnany, Kansas City, MO (US); Jalyn C. Stanley, Kansas City, MO (US)

(73) Assignee: Hallmark Cards, Incorporated, Kansas City, MO (US)

( * ) Notice: Subject to any disclaimer, the term of this patent is extended or adjusted under 35 U.S.C. 154(b) by 4 days.

(21) Appl. No.: 16/998,360

(22) Filed: Aug. 20, 2020

Related U.S. Application Data

(60) Provisional application No. 62/889,294, filed on Aug. 20, 2019.

(51) Int. Cl.
*B65B 43/46* (2006.01)
*B25J 15/00* (2006.01)
*B25J 15/06* (2006.01)
*B65B 35/18* (2006.01)
*B65G 1/10* (2006.01)
*B65G 47/90* (2006.01)
*B65G 47/91* (2006.01)

(52) U.S. Cl.
CPC ........ *B65G 47/918* (2013.01); *B25J 15/0028* (2013.01); *B25J 15/0616* (2013.01); *B65B 35/18* (2013.01); *B65G 1/10* (2013.01); *B65G 47/907* (2013.01); *B65G 2203/0233* (2013.01)

(58) Field of Classification Search
CPC ................................. B65H 3/64; B65B 43/46
See application file for complete search history.

(56) References Cited

U.S. PATENT DOCUMENTS

| 2,912,240 | A | * | 11/1959 | Frankle | B65H 3/0833 |
| | | | | | 271/106 |
| 3,225,948 | A | * | 12/1965 | Mumma | B65B 23/02 |
| | | | | | 414/421 |
| 4,685,714 | A | * | 8/1987 | Hoke | B66C 1/0243 |
| | | | | | 294/81.2 |
| 4,723,353 | A | * | 2/1988 | Monforte | B25J 15/0052 |
| | | | | | 414/737 |
| 5,024,575 | A | * | 6/1991 | Anderson | B65G 47/90 |
| | | | | | 414/737 |
| 5,535,997 | A | * | 7/1996 | Croyle | B65H 3/0816 |
| | | | | | 271/106 |
| 5,778,640 | A | * | 7/1998 | Prakken | B65B 5/061 |
| | | | | | 53/538 |

(Continued)

FOREIGN PATENT DOCUMENTS

| EP | 2168892 A1 | * | 3/2010 | .......... B25J 11/0045 |
| JP | 2006062000 A | * | 3/2006 | |
| JP | 2018104177 A | * | 7/2018 | .......... D05B 33/006 |

*Primary Examiner* — Gerald McClain
(74) *Attorney, Agent, or Firm* — Practus, LLP; Jesse J. Camacho

(57) ABSTRACT

Systems and methods for selecting and packing articles include an article picking device coupled to a multi-axis movement mechanism, and a high-density storage system for holding a plurality of cartridges, with each cartridge housing a plurality of articles. The article picking device can include one or more suction mechanisms, one or more gripping mechanisms, or both.

9 Claims, 21 Drawing Sheets

(56) References Cited

U.S. PATENT DOCUMENTS

| | | | | |
|---|---|---|---|---|
| 7,017,961 | B1* | 3/2006 | Parnell | B25J 15/0616 294/2 |
| 8,414,042 | B2* | 4/2013 | Landes | B65G 47/90 294/67.31 |
| 9,156,570 | B2* | 10/2015 | Lomerson, Jr. | B65B 61/207 |
| 10,639,790 | B1* | 5/2020 | Bacon | B07C 5/3404 |
| 11,623,352 | B2* | 4/2023 | Wagner | B25J 15/0061 294/188 |
| 2004/0148911 | A1* | 8/2004 | Hermodsson | B65B 43/46 53/558 |
| 2006/0045721 | A1* | 3/2006 | de Koning | B65G 47/91 414/751.1 |
| 2009/0320417 | A1* | 12/2009 | Gilmore | B65G 47/90 53/235 |
| 2011/0071666 | A1* | 3/2011 | Martin | B65H 3/44 221/312 R |
| 2016/0073584 | A1* | 3/2016 | Davidson | A01D 46/30 294/198 |
| 2020/0078939 | A1* | 3/2020 | Jeong | B25J 9/1697 |
| 2020/0198157 | A1* | 6/2020 | Hirata | B25J 15/0061 |
| 2021/0094716 | A1* | 4/2021 | Showman | B31B 50/005 |
| 2021/0402618 | A1* | 12/2021 | Wagner | B25J 15/0028 |
| 2023/0182936 | A1* | 6/2023 | Steiner | B65H 5/08 271/5 |

* cited by examiner

SYSTEMS AND PROCESSES FOR SELECTING AND PACKING ARTICLES

CROSS-REFERENCE TO RELATED APPLICATIONS

This application claims the benefit of U.S. Provisional App. No. 62/889,294, filed Aug. 20, 2019, the entirety of which is incorporated by reference herein.

TECHNICAL FIELD

The present disclosure relates to selecting and packing articles. More particularly, the present disclosure relates to systems and processes for selecting and packing articles, including greeting cards.

BACKGROUND

Conventionally, selecting and packing articles for various orders can be a resource intensive process that may also be error prone. For instance, such a process may entail a resource intensive effort of traversing through a warehouse or storage location to identify a desired article. Further, in such conventional processes, once the desired article is selected it is usually moved and combined with other articles into a container for further processing. There is a need to develop new systems and processes for selecting and packing articles that are more efficient.

BRIEF DESCRIPTION OF THE DRAWINGS

Illustrative aspects of the present invention are described in detail below with reference to the attached drawing figures, which are incorporated by reference herein and wherein.

DESCRIPTION

Figure 1:
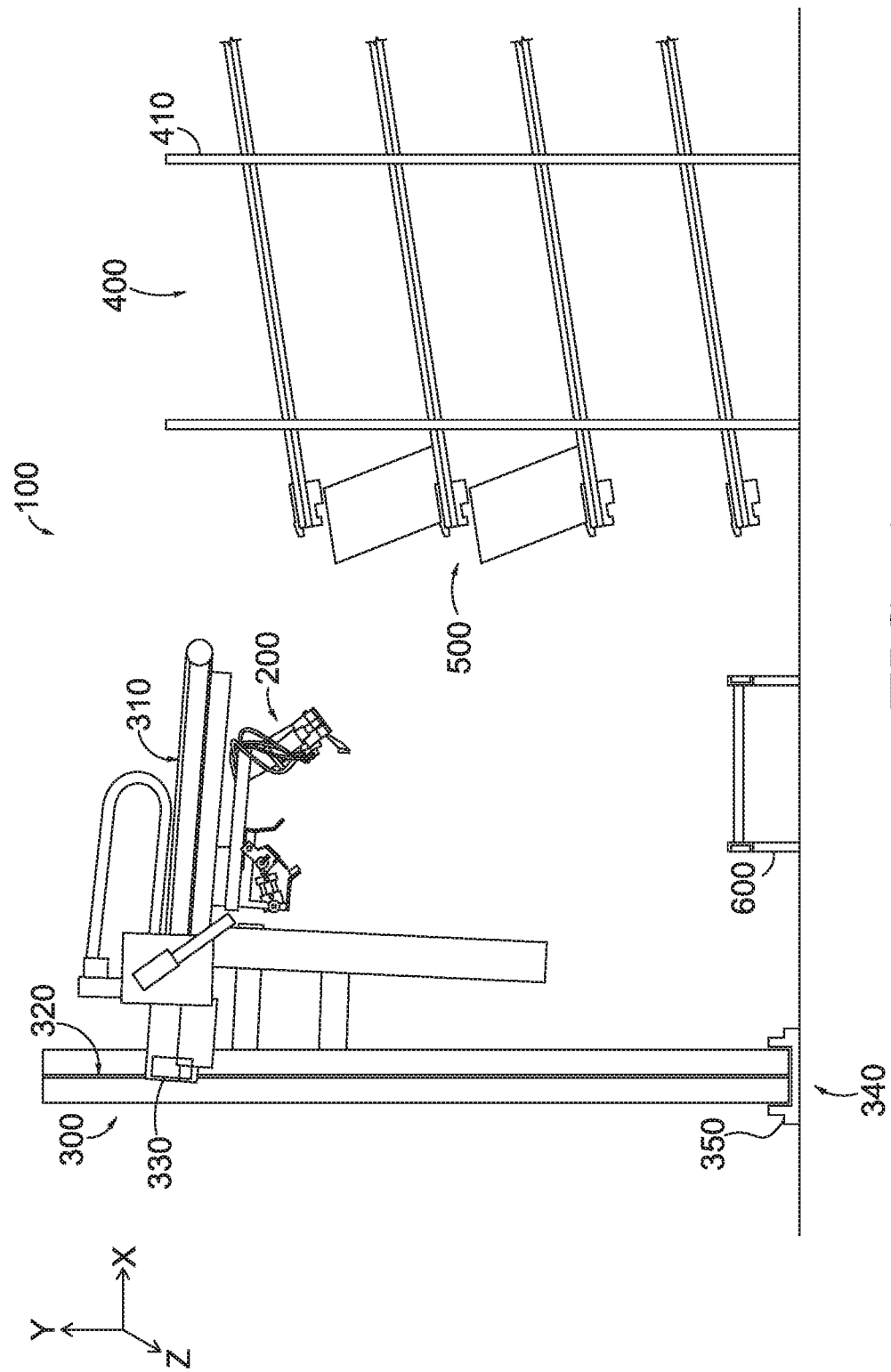
FIG. 1 is a side view of a system for selecting and packing articles, particularly showing an article picking device coupled to a multi-axis movement mechanism, a high-density storage system, and a conveyance system, in accordance with aspects hereof.

Aspects herein are directed to systems and processes for selecting and packing articles. Certain conventional processes for selecting and packing articles, such as greeting cards, can include the resource intensive process of traversing a warehouse location to identify a desired greeting card, selecting the correct number of the desired greeting cards, and placing the selected greeting cards into a container for further downstream process, such as preparing for shipping. However, these conventional processes, such as traversing a location to identify a desired greeting card, can be resource intensive. Further, conventional processes and systems require significant space for storing, housing, and presenting the various greeting cards for selection and packing.

The systems and processes disclosed herein can alleviate one or more of the problems discussed above. In aspects, at a high level, the systems and processes disclosed herein provide systems and processes for selecting and packing articles that can utilize an article picking device coupled to a multi-axis movement mechanism to quickly and efficiently move to a desired location to select and pick a desired article. In aspects, the article picking device can include one or more sensors that can identify when the article picking device is near the desired article, thereby enabling the article picking device and/or the multi-axis movement mechanism to slow down as it approaches the desired article. In such aspects, this variable rate of speed exhibited by the article picking device and/or the multi-axis movement mechanism can provide greater process efficiency. For instance, the article picking device can move at a high rate of speed to traverse to the general vicinity of the desired article, and then once close to the desired article, as indicated by the one or more sensors, the article picking device and/or the multi-axis movement mechanism can slow down to approach and select the desired article.

Further, in various aspects, the systems and processes described herein can include a high-density storage system, which can maximize the presentation and storage of various articles into a smaller footprint, thereby reducing storage space. In such aspects, the high-density feature of the storage system can enable the article picking device to traverse to desired article in a quick and efficient manner due to the reduced size of the storage space. Further, in various aspects as discussed in detail below, the high-density storage system and associated cartridges housing a plurality of articles can include specific structural features to enable efficient access to the desired articles.

Accordingly, in one aspect a system for selecting and packing articles is provided. The system can include a multi-axis movement mechanism and an article picking device. The article picking device can be coupled to the multi-axis movement mechanism. The article picking device can include one or more gripping mechanisms, where each of the one or more gripping mechanisms comprises first and second gripping members. The system can also include a high-density storage system adapted to store a plurality of cartridges. Each of the plurality of cartridges can be adapted to house a plurality of articles.

In another aspect, an article picking device is provided. The article picking device can include one or more suction mechanisms, one or more gripping mechanisms, or a combination thereof; one or more stabilization members; and one or more sensors.

In yet another aspect, a method for selecting articles is provided. The method can include utilizing a multi-axis movement mechanism to transport an article picking device to a high-density storage system. The high-density storage system can include a plurality of cartridges, where each of the plurality of cartridges contains a plurality of articles. The method can also include utilizing the article picking device to retrieve an article from one of the plurality of cartridges. Additionally, the method can include transporting the article to a conveyance system.

Turning now to the Figures and FIG. 1 in particular, a system 100 for selecting and packing articles is depicted. As discussed above, in certain aspects, the articles can include greeting cards. In various aspects, one or more of the articles, e.g., greeting cards, can be present in a wrapping material. In such aspects, the wrapping material can include one or more convenient plastic film materials.

The system 100 of FIG. 1 can include an article picking device 200 coupled to a multi-axis movement mechanism 300, a high-density storage system 400, and a conveyance system 600. It should be understood, that the system 100 depicted in FIG. 1 is one example system for selecting and packing articles and that other components and/or configurations of components can be utilized to accomplish the processes disclosed herein.

At a high level, the system 100 can receive an order or instructions for selection of specific articles. In certain aspects not depicted in the figures, the system 100 or a component thereof can include a computing device or a control unit for receiving orders or instructions to select and/or pack specific articles. For instance, the article picking device 200 can include or be communicatively coupled to a computing device that receives orders for selecting and/or packing specific articles. In addition, such a computing device may also include other functions, such as the ability to communicate back to one or more upstream systems. Such functions are discussed further below.

In aspects at a high level, the multi-axis movement mechanism 300 can position the article picking device 200 to retrieve one or more articles from one of a plurality of cartridges 500 present in the high-density storage system 400. Further, in such aspects, the selected articles can be positioned on a conveyance system 600 for further downstream processing. In various aspects, prior to, or subsequent to, being placed on the conveyance system 600, the selected articles can be placed or packed in a container with other selected articles and labeled or processed for shipment.

As discussed above, the overall structure and function of the system 100 can allow for the efficient selection of articles utilizing a smaller footprint and less resources than certain conventional systems. The specific components of the example system 100 will be discussed in detail below.

As discussed above, the article picking device 200 can be coupled to a multi-axis movement mechanism 300. In certain aspects, the multi-axis movement mechanism 300 can be operable to move the article picking device 200 in x, y, and z directions. In certain aspects, such as that depicted in FIG. 1, the multi-axis movement mechanism 300 can include individual tracks for such movements, such as track 310 for movement of the article picking device 200 in the x-direction, track 320 for movement of the article picking device 200 in the y-direction, and/or track 330 for movement of the article picking device 200 in the z-direction. In the same or alternative aspects, the multi-axis movement mechanism 300 can include a movement member 340 for moving the base 350 of the multi-axis movement mechanism 300. In such aspects where the movement member 340 is present, one or more of the track 310, the track 320, or the track 330 may be minimized or absent, as the movement member 340 can at least partly move the base 350 and/or the article picking device 200 in one or more of the x-, y-, or z-directions. It should be understood that the multi-axis movement mechanism 300 depicted in FIG. 1 is one example of a multi-axis conveyance mechanism and the other structures and/or mechanisms for moving the article picking device 200 are contemplated by the disclosure herein. In aspects, a computing device, such as the computing device discussed above, can provide movement instructions for the multi-axis movement mechanism 300.

Figure 2A:
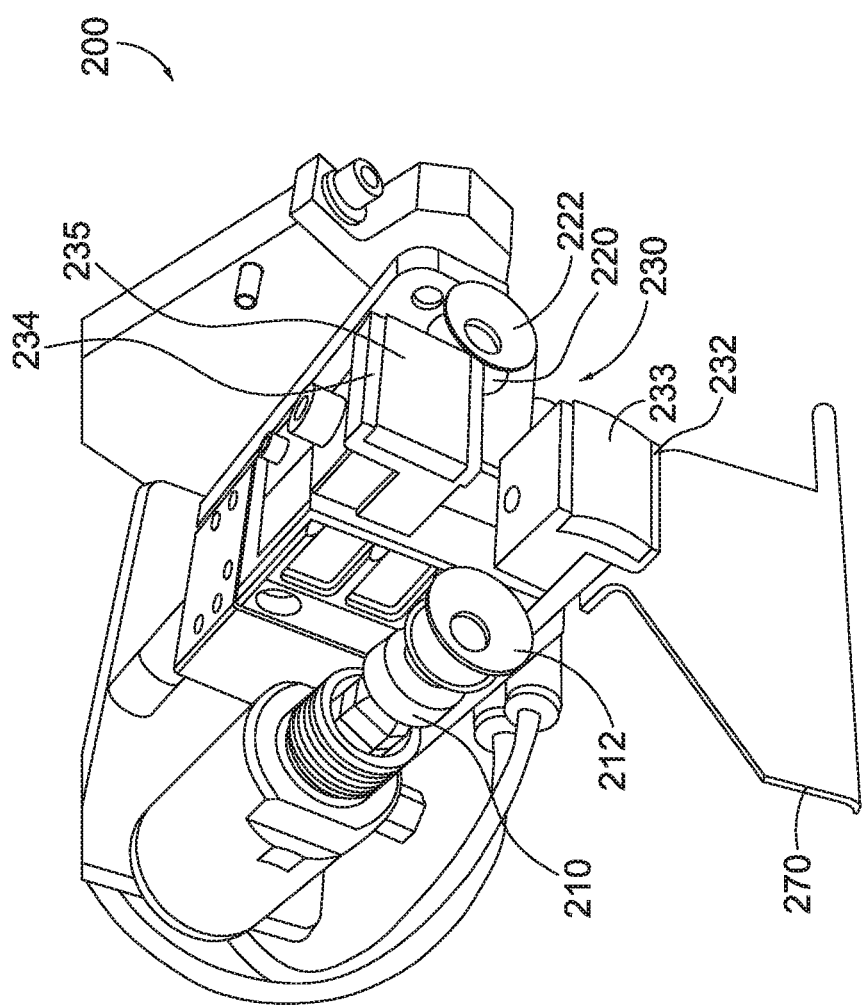
FIG. 2A is a top and side perspective view of an article picking device, in accordance with aspects hereof.
Figure 2B:
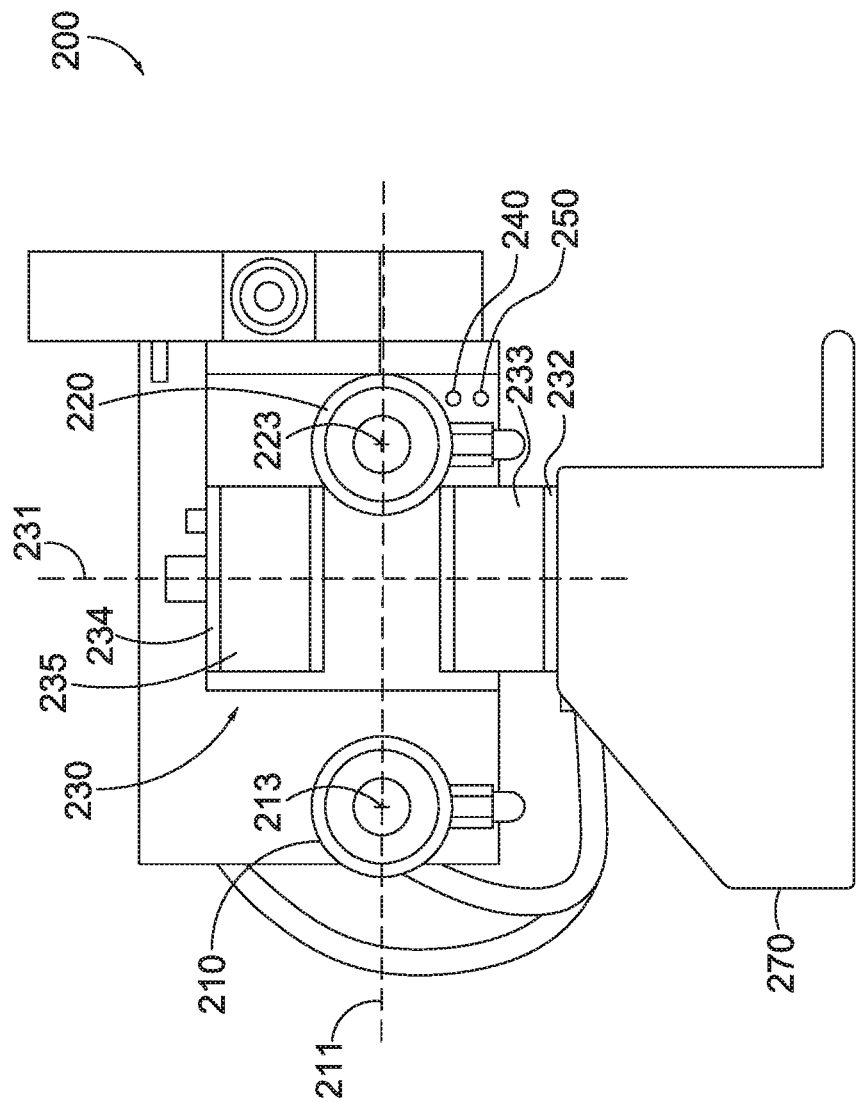
FIG. 2B is a front view of the article picking device of FIG. 2A, in accordance with aspects hereof.
Figure 3:
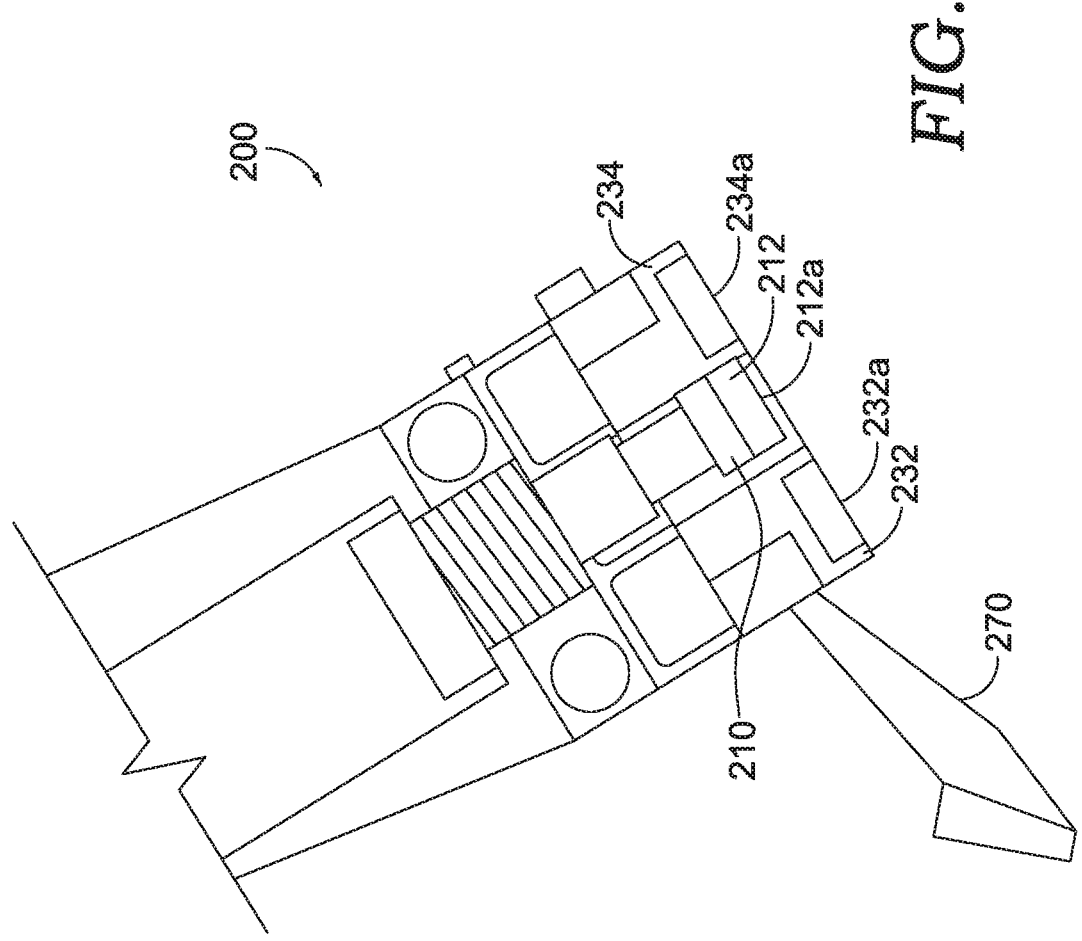
FIG. 3 is a side-view of the article picking device of FIGS. 2A and 2B, in accordance with aspects hereof.
Figure 4A:
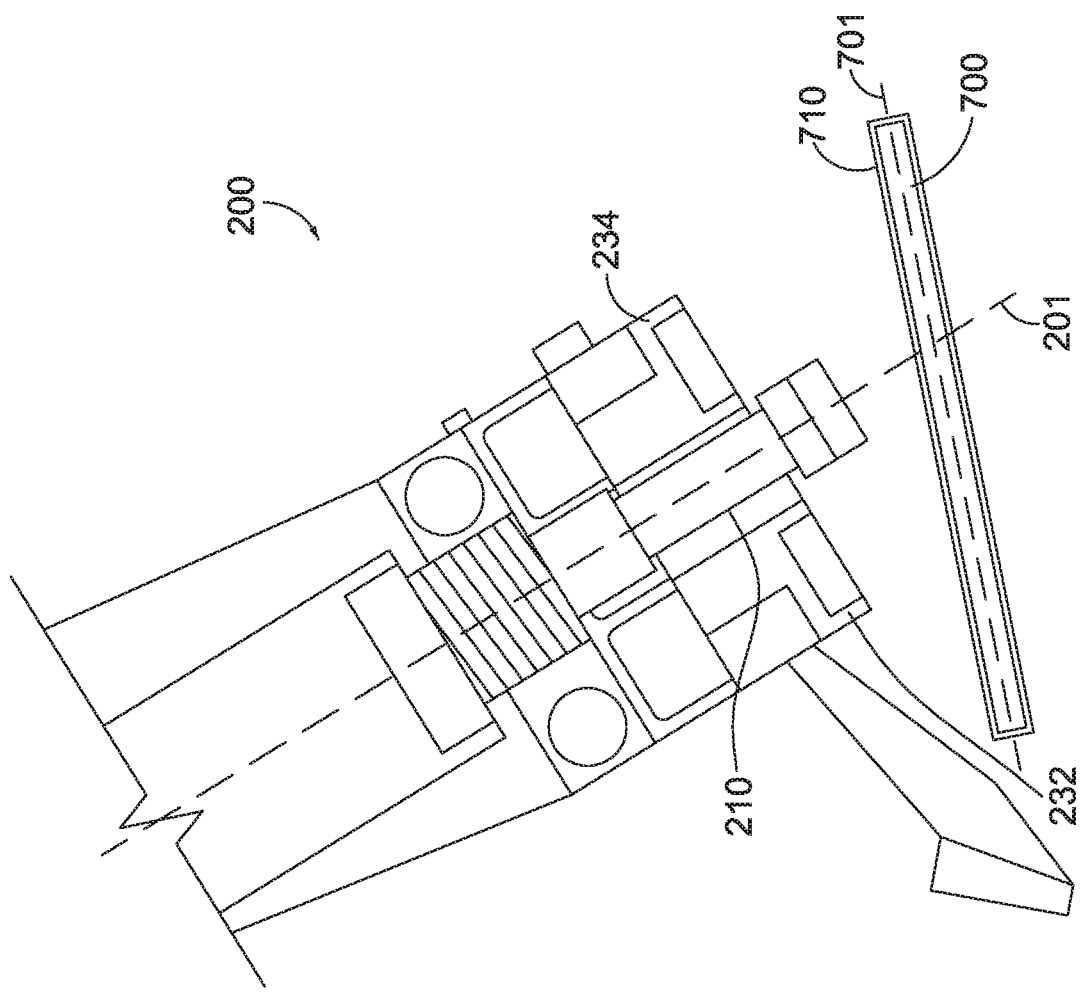
FIG. 4A is a side-view of the article picking device of FIG. 3 adjacent an article, with the first suction mechanism in an extended position, in accordance with aspects hereof.
Figure 4B:
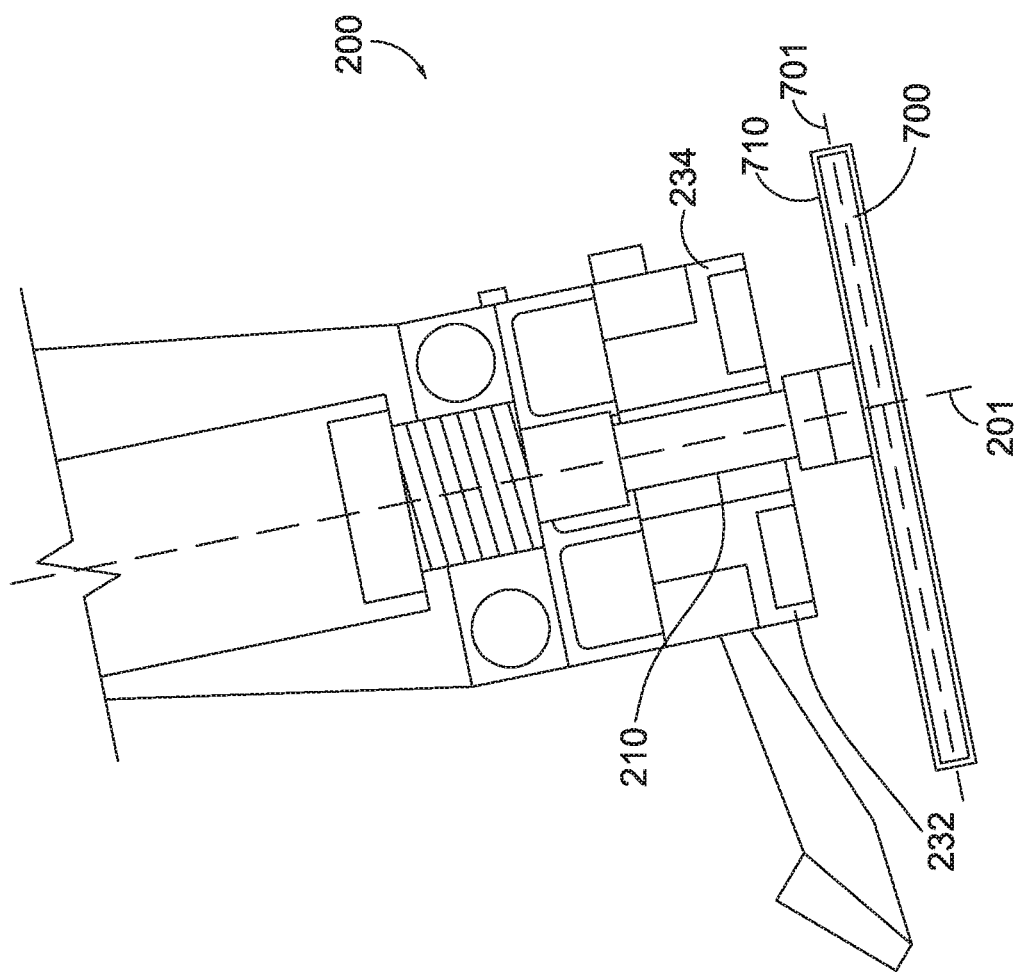
FIG. 4B is a side-view of the article picking device of FIG. 3, with a portion of the first suction mechanism in contact with the article while in an extended position, in accordance with aspects hereof.
Figure 4C:
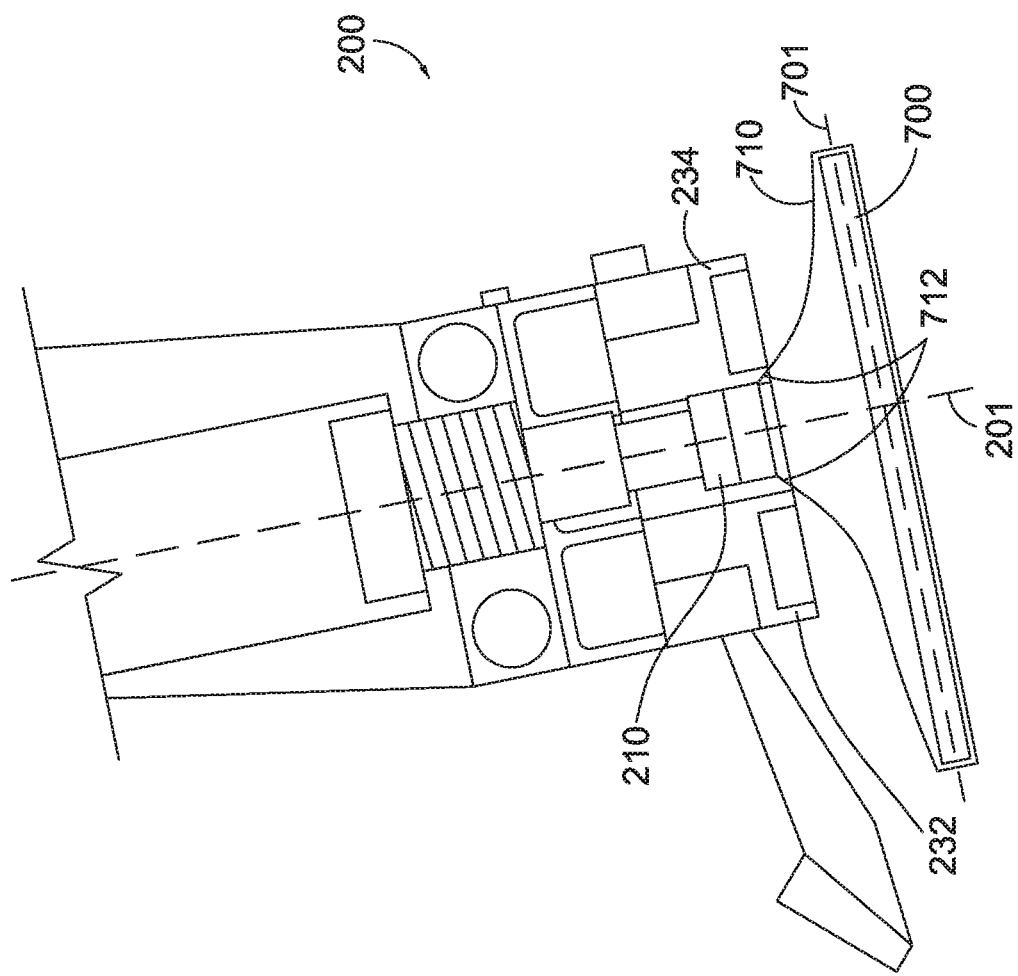
FIG. 4C is a side-view of the article picking device of FIG. 3, with the first suction mechanism in a retracted position and showing a portion of the wrapping material positioned between the first gripping member and the second gripping member, while the first gripping member and the second gripping member are in an open configuration, in accordance with aspects hereof.
Figure 4D:
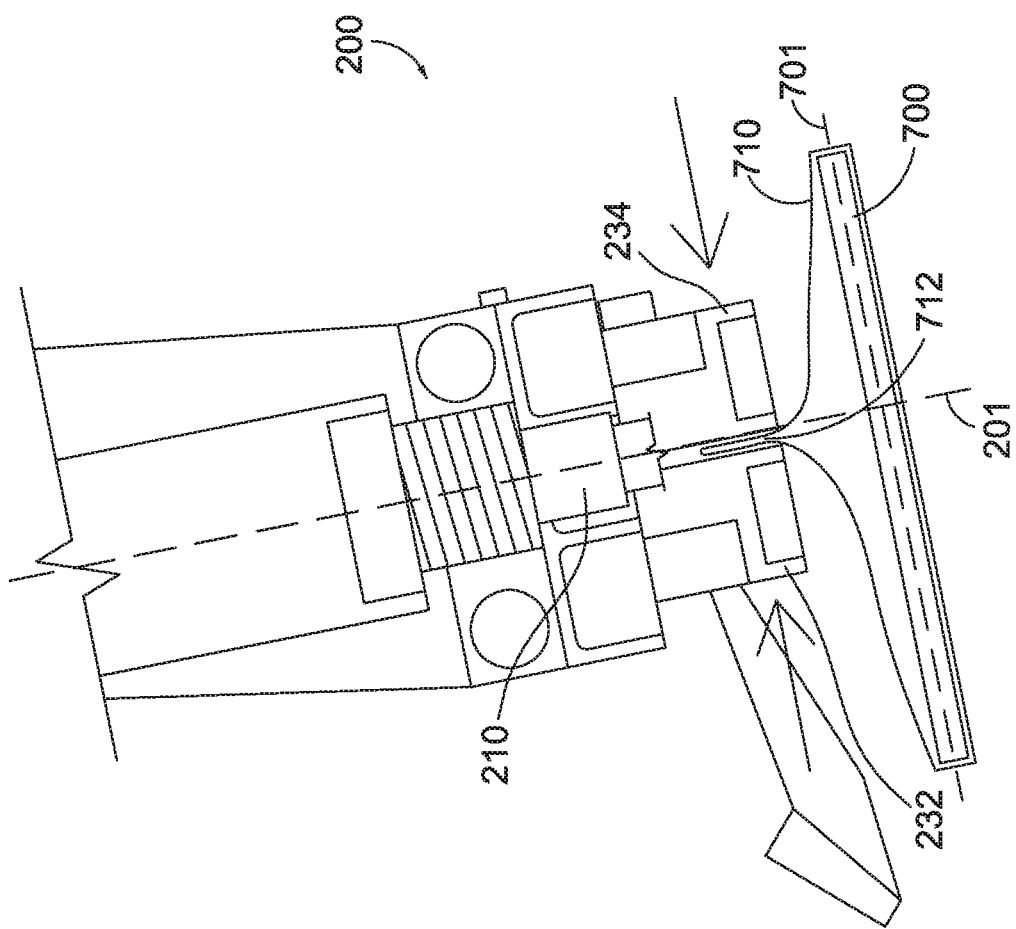
FIG. 4D is a side-view of the article picking device of FIG. 3, with the first suction mechanism in a retracted position and with the first gripping member and the second gripping member in a closed configuration, showing a portion of the wrapping material of the article positioned between the first gripping member and the second gripping member, in accordance with aspects hereof.
Figure 4E:
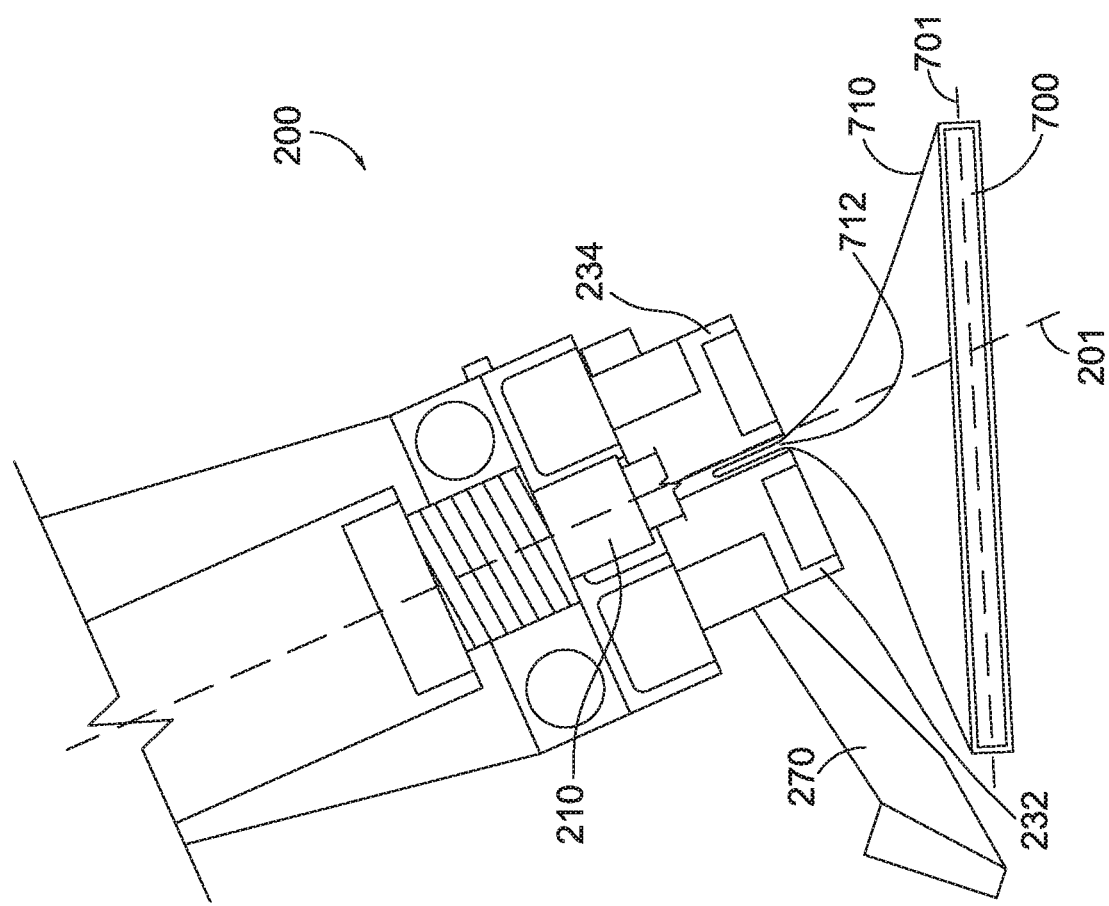
FIG. 4E is a side-view of the article picking device of FIG. 4D, showing the article picking device pivoted back with respect to an axis of the article, in accordance with aspects hereof.

FIGS. 2A-4E depict one example article picking device 200. In FIGS. 3-4E, portions of the article picking device 200 have been removed to highlight other specific portions described herein with respect to these Figures. As best can be seen in the aspect depicted in FIGS. 2A and 2B, the article picking device 200 can include a first suction mechanism 210 and a second suction mechanism 220, which are laterally spaced apart from one another. In aspects, the first suction mechanism 210 and the second suction mechanism 220 can be adapted to initially pick up, select, and/or engage an article, such as a greeting card or associated wrapping material. For instance, in one aspect, the article picking device 200 may be positioned, e.g., via the multi-axis movement mechanism 300, such that a first contacting member 212 of the first suction mechanism 210 and a second contacting member 222 of the second suction mechanism 220 contact a selected article. In one aspect, the first contacting member 212 and the second contacting member 222 can be adapted to provide a seal when in contact with the selected article such that negative or vacuum pressure applied from the first suction mechanism 210 and the second suction mechanism 220 can temporarily adhere the selected article thereto. In aspects, the negative or vacuum pressure may be sufficient to maintain the selected article adhered to the first contacting member 212 and/or the second contacting member 222 as the article picking device 200 moves, e.g., via the multi-axis movement mechanism 300, to place the selected article in a desired location.

As discussed above, in certain aspects, the articles described herein can include greeting cards. In such aspects, the lateral spacing between the first suction mechanism 210 and the second suction mechanism 220 is such that both the first suction mechanism 210 and the second suction mechanism 220 can contact a greeting card. In such aspects, a center point 213 of the first suction mechanism 210 can spaced apart from a center point 223 of the second suction mechanism 220 by a distance that is of from 1 inch to 12 inches, from 2 inches to 10 inches, or from 3 inches to 9 inches.

In certain aspects, the article picking device 200 can include a gripping mechanism 230, e.g., in order to secure or further secure a portion of the article or a wrapping material around the article. As best seen in the aspect depicted in FIGS. 2A, 2B, and 3, the gripping mechanism 230 can include a first gripping member 232 spaced apart from a second gripping member 234. In aspects, the first gripping member 232 and the second gripping member 234 can shift towards and away from one another in order to allow the gripping mechanism 230 to grab or hold onto a portion of the article or a portion of an associated wrapping material. Below, the gripping mechanism 230 is further described in operational detail.

In aspects, the article picking device 200 can include one or more sensors to better facilitate the movement and/or functions of the article picking device 200. For example, in such aspects, one or more sensors can control the speed and/or orientation of the article picking device 200 as it approaches contact with an article or a cartridge containing one or more articles. In such aspects, any or all of the sensors discussed herein can be communicatively coupled to a computing device or other system that can receive information from any or all of these sensors and utilize such information to control the movement, speed, and/or orientation of the multi-axis movement mechanism 300 and/or the article picking device 200.

In various aspects, the article picking device 200 can include one or more photoelectric sensors. In one aspect, the photoelectric sensors can include a fixed field sensor. FIG. 2B depicts one example photoelectric sensor, sensor 240. In aspects, the sensor 240 can be utilized to identify a portion of a cartridge 510, e.g., an edge of the cartridge, in order to ensure that the article picking device 200 is positioned appropriately for continued movement into and/or towards the cartridge for retrieval of an article. In such aspects, once the sensor 240 identifies the edge of the cartridge, this information can be communicated to a computing device or control unit that can provide instructions to slow the speed of the multi-axis movement mechanism 300 and the article picking device 200 coupled thereto. In such aspects, this control of the speed of the multi-axis movement mechanism 300 and the article picking device 200 allows for increased efficiency in selecting and packing articles. For instance, the multi-axis movement mechanism 300 can move at an increased rate of speed, e.g., 80 inches per second or more, 100 inches per second or more, or 120 inches per second or more, when positioning the article picking device 200 near the selected cartridge and/or article, and then the sensor 240 can detect the presence of the edge of the cartridge ultimately causing the multi-axis movement mechanism 300 to decrease its speed as the article picking device 200 moves in to engage with the desired article. Additionally or alternatively, as discussed above, the sensor 240 can identify that the article has been picked up by the article picking device 200 and been removed from the cartridge.

Further as seen in the aspect depicted in FIG. 2B, the article picking device 200 can include an additional photoelectric sensor, e.g., photoelectric sensor 250. In aspects, the photoelectric sensor 250 can be utilized to detect the presence of the article inside of the cartridge. In aspects, the photoelectric sensor 250 can be utilized to identify a top article in a stack of articles within a cartridge and/or to identify that the article has been picked up by the article picking device 200. Such an identification can aid in the control of the speed or movement of the article picking device 200, alone or in combination with the identification of an edge of the cartridge via the sensor 240 discussed above. It should be understood that the photoelectric sensors 240 and 250 are example sensors and that other convenient types of sensors are also contemplated for use in the systems and methods described herein.

In certain aspects, the article picking device 200 can include a stabilization member 270. In various aspects, the stabilization member 270 is adapted to stabilize the article once it is picked up by the article picking device 200 and is being transported from the cartridge to another location. For instance, in aspects, the stabilization member 270 may aid in stabilizing the article from the forces and/or abrupt movements of the article caused by the acceleration and deceleration of the article as it is moved from the cartridge and delivered to the conveyance system.

As discuss above, the article picking device 200 can include a gripping mechanism 230 that can be utilized to secure or further secure a portion of the article or associated wrapping. Further, as discussed above, the first gripping member 232 and the second gripping member 234 can shift towards and away from one another in order to allow the gripping mechanism 230 to grab or hold onto a portion of the article or a portion of the associated wrapping material. In aspects, the shifting of the first gripping member 232 and the second gripping member 234 can include an open configuration, where the first gripping member 232 and the second gripping member 234 are spaced apart, and a closed configuration, where the first gripping member 232 and the second gripping member 234 have shifted towards one another, in order to hold onto or grab a portion of the wrapping material and/or article.

In the aspect depicted in FIGS. 2A-4C, the gripping mechanism 230 is in the open configuration, while in the aspect depicted in FIGS. 4D and 4E the gripping mechanism 230 is in the closed configuration. In aspects, the first gripping member 232 and the second gripping member 234 can shift between the open and closed configurations using any convenient movement mechanism, e.g., via a pneumatic mechanism. FIGS. 4A-4E will now be described in detail, which depict the article picking device 200 in operation as it approaches and picks up an article.

As best seen in FIG. 4A, the article picking device 200 is adjacent an article 700, e.g., a greeting card, having a wrapping material 710 thereon. In the aspect depicted in FIG. 4A, the first suction mechanism 210 is in an extend position as it approaches the article 700. As seen in FIG. 4B, the article picking device 200 is now in contact with the article 700. For instance, as depicted in FIG. 4B, the first suction mechanism 210 is in initial contact with the article 700, with the first suction mechanism 210 still in the extended position. As can be seen by comparing FIGS. 4A and 4B, as the article picking device 200 contacts the article 700, the article picking device 200 pivots or rotates relative to the article 700 and relative to the track 310 of the multi-axis movement mechanism 300. This pivoting motion can be seen by comparing the relative relationship between the center axis 201 of the article picking device 200 and the center axis 701 of the article 700, in FIGS. 4A and 4B. In aspects, this pivoting motion upon contact with the article 700 can facilitate a better positioning of the article picking device 200 and/or the article gipping mechanism 230 with respect to the article 700, thereby allowing for efficient and effective gripping of the article 700 by the article picking device 200. In one aspect, a proximity sensor may be positioned on the article picking device 200 and/or the track 310, which may detect this pivoting motion of the article picking device 200. In such an aspect, the detection of this pivoting motion can communicate to a computing device or control unit that the article picking device 200 has engaged with an article.

FIG. 4C depicts the first suction mechanism 210 maintaining contact with the article 700, but in a retracted configuration, where the first suction mechanism 210 retracted back towards the article picking device 200. In certain aspects, once the first suction mechanism 210 contacts an article, negative pressure or suction can be achieved thereby causing the first suction mechanism 210 to retract as depicted in FIG. 4C.

In the aspect depicted in FIG. 4C, the first suction mechanism 210 is engaged with a portion 712 of a wrapping material 710 positioned around the article 700. In this aspect, the portion 712 of the wrapping material 710 is positioned between the first gripping member 232 and the second gripping member 234, with the gripping mechanism 230 in the open configuration. In certain aspects, one or more of the sensors discussed above, e.g., the proximity sensor, can detect the physical contact between the article 700 and the article picking device 200, and a control unit or computing device in turn may instruct the article picking device 200 to shift the gripping mechanism 230 into the closed configuration. FIG. 4D depicts the gripping mechanism 230 in the closed configuration where the portion 712 of the wrapping material 710 is pinched between the first gripping member 232 and the second gripping member 234.

In aspects, the relative positioning of the first suction mechanism 210, the second suction mechanism 220, and the gripping mechanism 230 can facilitate the secure, temporary attachment of the article or a portion of the associated wrapping material to the article picking device 200. For instance, the position of the first suction mechanism 210 and the second suction mechanism 220 relative to the first gripping member 232 and the second gripping member 234 allows for efficient securement of the article. As best seen in FIG. 2B, the first gripping member 232 and the second gripping member 234 are spaced apart and positioned on opposite sides of the gripping center axis 231 of the gripping mechanism 230. Further, the first gripping member 232 and the second gripping member 234 are spaced apart and positioned on opposite sides of the suction center axis 211. Further, as can be seen in FIG. 3, the terminal edge 212a of the first contacting member 212 is offset from: the terminal edge 232a of the first gripping member 232; and the terminal edge 234a of the second gripping member 234. In such aspects, this relative positioning of the first suction mechanism 210, the second suction mechanism 220, and the gripping mechanism 230 facilitates the placement of a portion of the wrapping material from an article in between the first gripping member 232 and the second gripping member 234 and to securely hold that portion of the wrapping material when in the closed configuration.

In aspects, each of the first gripping member 232 and the second gripping member 234 can include a contacting pad that can contact the article to provide increased friction to aid in securing the article thereto. For instance as best seen in FIG. 2B, the first gripping member 232 can include a first contacting pad 233 and the second gripping member 234 can include a second contacting pad 235. In aspects, the first and second contacting pads 233 and 235, respectively, can include a rubber or other synthetic material that can aid in providing increased friction when contacting an article.

FIG. 4E depicts the article picking device 200 maintaining hold of the article 700, via the gripping mechanism 230, with the article picking device 200 having pivoted back to its original position, as depicted in FIG. 4A. In this aspect depicted in FIG. 4E, the article picking device 200 may move and transport the article 700 to a desired location. In such aspects, the stabilization member 270 may contact the article 700 during movement to stabilize the position of the article 700.

Figure 5:
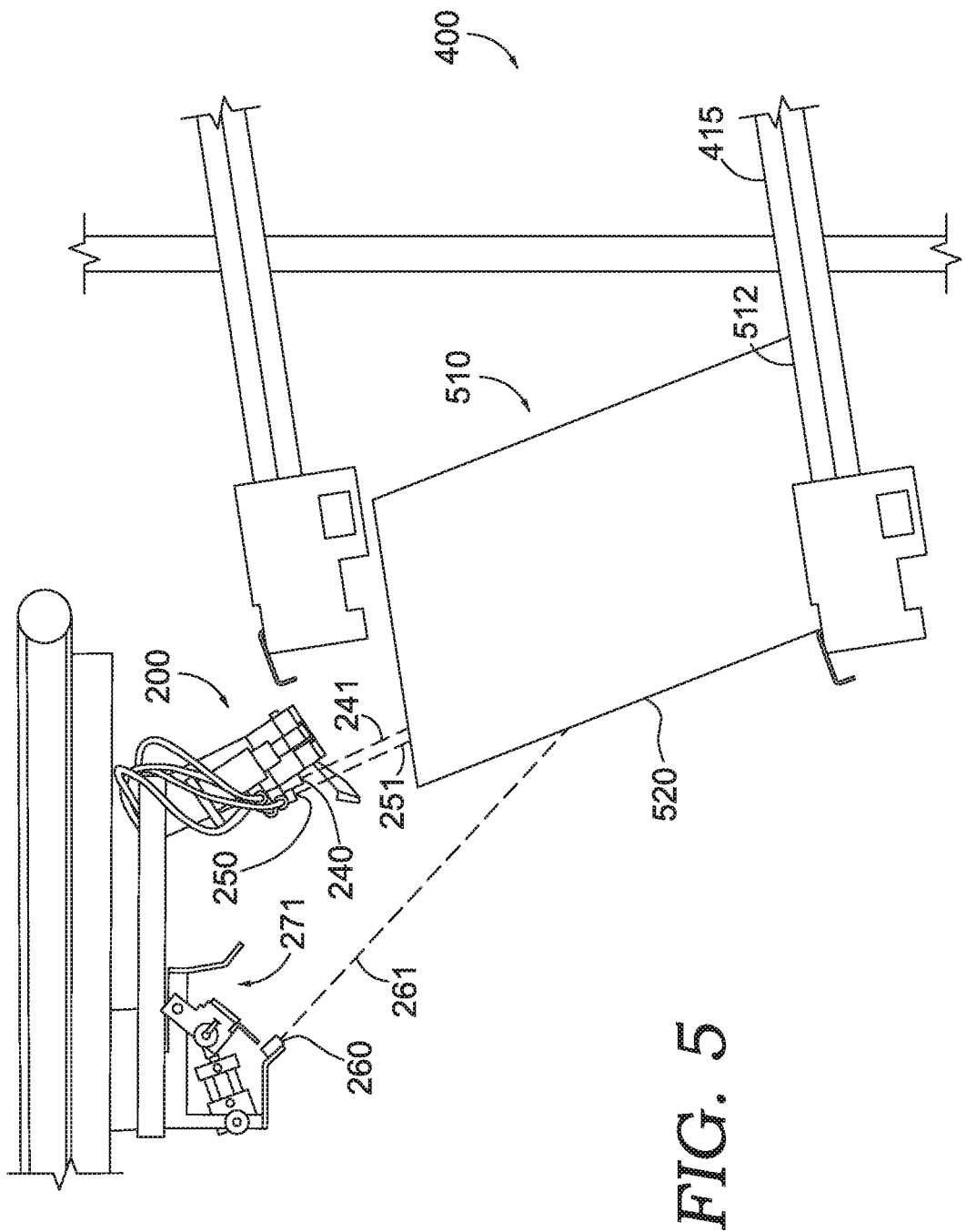
FIG. 5 is a side-view of the article picking device and a portion of the track of FIG. 1, particularly showing a schematic representation of various sensor paths associated with the article picking device sensors, and a cutaway view showing a portion of the high-density storage system and a cartridge of FIG. 1, in accordance with aspects hereof.

FIG. 5 depicts one example article picking device, e.g., article picking device 200, as it approaches a cartridge, e.g., cartridge 510. FIG. 5 also depicts schematic representations of various sensors. For instance, as can be seen in the aspect depicted in FIG. 5, a dashed line 241 depicts an example sensor path of the photoelectric sensor 240 sensing a portion of the cartridge 510, e.g., an edge of the cartridge 510. As discussed above, in aspects, such a sensing of the edge of the cartridge can ensure that the article picking device 200 is positioned appropriately for continued movement into and/or towards the cartridge 510 for retrieval of an article. Further, as can be seen in the aspect depicted in FIG. 5, a dashed line 251 depicts an example sensor path of the sensor 250 sensing an article present in the cartridge 510. The sensors 240 and 250 are discussed above with reference to the article picking device 200 of FIG. 2B.

In certain aspects, an article picking device can include a sensor for detecting when a cartridge is empty. For instance as can be seen in the aspect depicted in FIG. 5, the article picking device 200 can include a sensor 260 that can detect the absence of articles in the cartridge 510, where dashed line 261 depicts the example sensor path of the sensor 260. In such aspects, the sensor 260 can be a reflective sensor that detects a reflective label or object on the bottom 512 of the cartridge 510, or the bottom 512 of the cartridge 510 can include a hole through which the sensor 260 can detect a reflective label or object present on the shelf 415 of the high-density storage system 400. In various aspects, the sensor 260 can be any convenient type of sensor that is capable of detecting that the cartridge 510 is empty. In such aspects, this information regarding that a cartridge is empty may be communicated to a computing device or a control unit, which may then communicate instructions to replace the empty cartridge. In aspects, the ability of the article picking device 200 to detect when a cartridge is empty may increase efficiency of the systems described herein as it is not necessary to count the number of articles in each cartridge, which significantly reduces the amount of resources required.

In various aspects, once it is determined or sensed that the cartridge 510 is empty the article picking device 200 may move the cartridge 510 off of the shelf 415. For instance as can be seen in the aspect depicted in FIG. 5, the article picking device 200 can include a cartridge transport mechanism 271 that may engage or grab the cartridge 510 for removal from the shelf 514. In the aspect depicted in FIG. 5, the cartridge transport mechanism 271 includes gripping members for engaging a portion of the cartridge 510, e.g., a sidewall 520, for removal from the shelf 415. In aspects, the cartridge transport mechanism 271 can include any convenient gripping mechanism for engaging all or a portion of a cartridge, e.g., the cartridge 510, for removal from the high-density storage system 400. In various aspects, the cartridge transport mechanism 271 can transport the cartridge 510 from the shelf 415 to a conveyance system, such as the conveyance system 600 described above with reference to FIG. 1, which may transport the empty cartridge to a processing location for refilling.

As discussed above, the systems and processes disclosed herein, such as the example system 100 depicted in FIG. 1, can include an article picking device 200 retrieving one or more articles from one of a plurality of cartridges 500 present in the high-density storage system 400. In various aspects, the design of each of the plurality of cartridges 500 and/or the high-density storage system 400 can aid in facilitating the efficient selection and packing of one or more articles. For instance, in various aspects, each of the cartridges can include structural features for facilitating the efficient movement of the article picking device 200 adjacent and/or within a cartridge.

Figure 6:
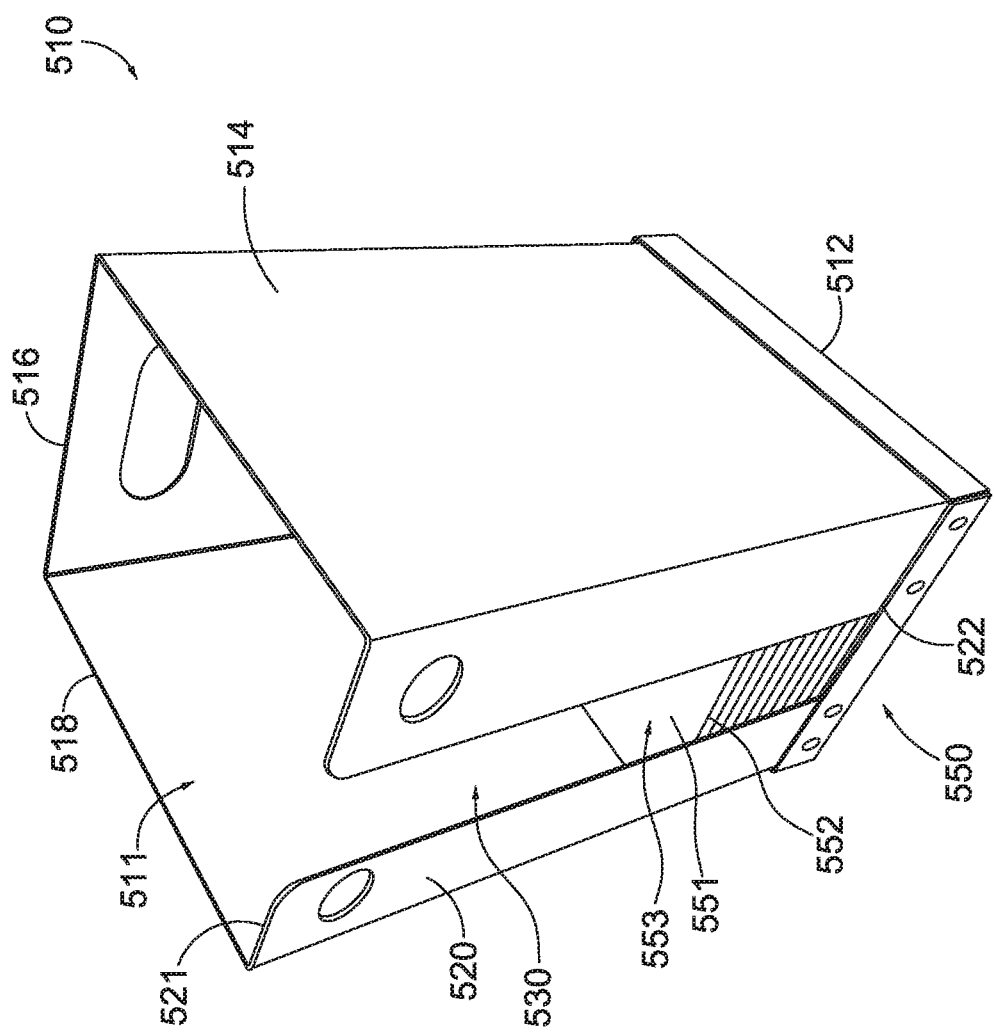
FIG. 6 is a top and side perspective view of a cartridge, in accordance with aspects hereof.

FIG. 6 depicts one example cartridge, cartridge 510, for use in the systems and processes described herein. The cartridge 510 of FIG. 6 includes a bottom surface 512 with sidewalls 514, 516, 518, and 520 extending up from the bottom surface 512. In the aspect depicted in FIG. 6, a plurality of greeting cards 550 is positioned within an interior portion 511 of the cartridge 510. As can be seen in FIG. 6, the plurality of greeting cards 550 are positioned to be lying flat on the bottom surface 512 of the cartridge 510, e.g., horizontally oriented within the interior portion 511 of the cartridge 510. Stated differently, the plurality of greeting cards 550 are positioned within the interior portion 511 of the cartridge 510 such that a front face and a back face of each of the plurality of greeting cards 550, e.g., the front face 551 and the back face 552 of the greeting card 553, is parallel to the bottom surface 512 of the cartridge 510. In such aspects, the orientation of the plurality of greeting cards 550 depicted in FIG. 6 can provide easy access to the article picking device 200, e.g., by having the front face 551 or the back face 552 presented for easy access to the first suction mechanism 210 and/or the second suction mechanism 220 of the article picking device 200.

In various aspects, one or more sidewalls of the cartridge 510 can be adapted to provide the article picking device 200 with efficient access to the plurality of greeting cards 550. For example, in the aspect depicted in FIG. 6, the sidewall 520 includes a slot 530 extending from a top edge 521 of the sidewall 520 to a bottom edge 522 of the sidewall 520. In aspects, the slot 530 is sized to allow the article picking device 200 and/or a portion of the multi-axis movement mechanism 300 to enter into the interior portion 511 of the cartridge 510.

Figure 7A:
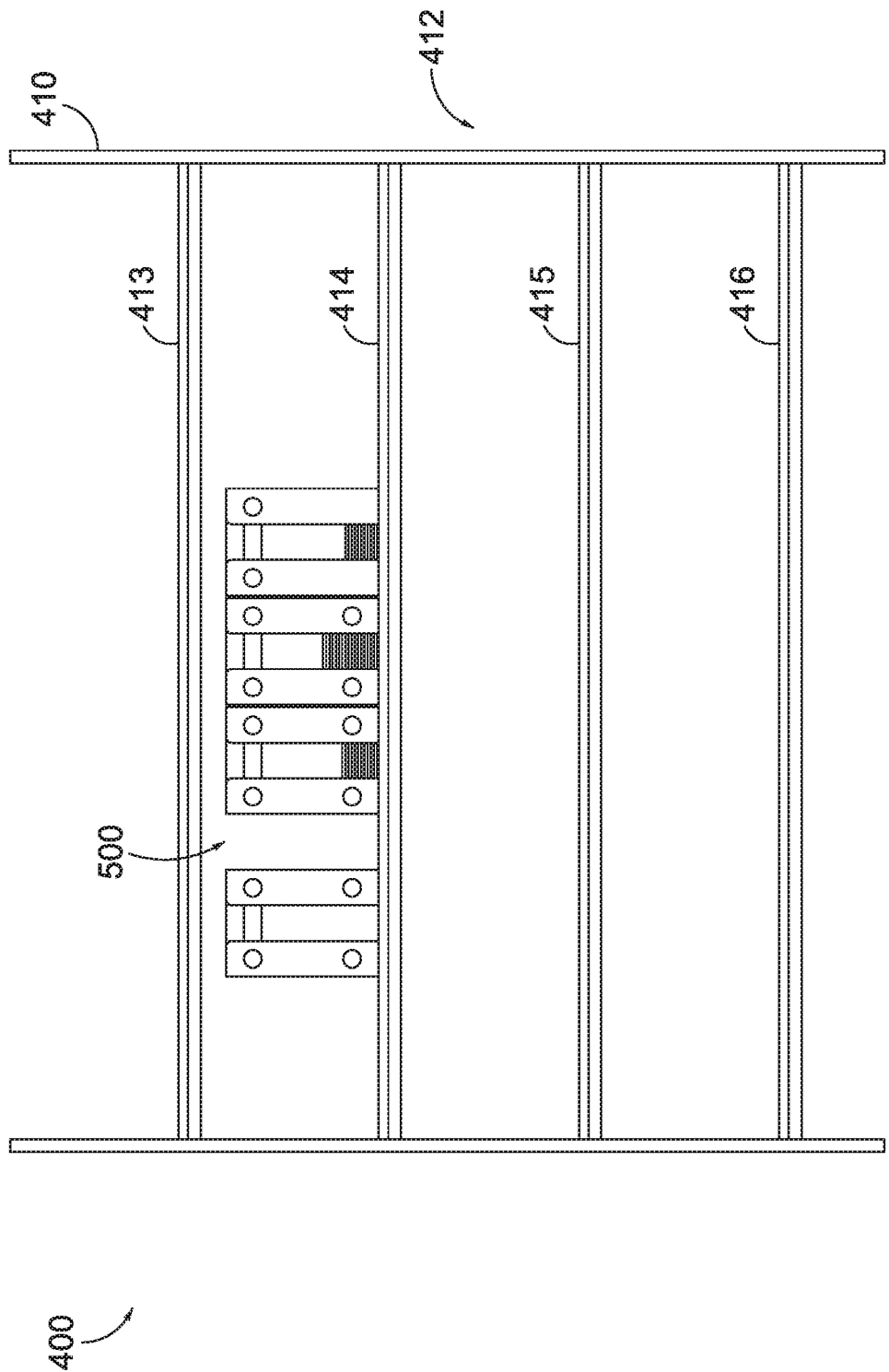
FIG. 7A is a front view of a high-density storage system particularly showing a storage unit with a plurality of cartridges, in accordance with aspects hereof.
Figure 7B:
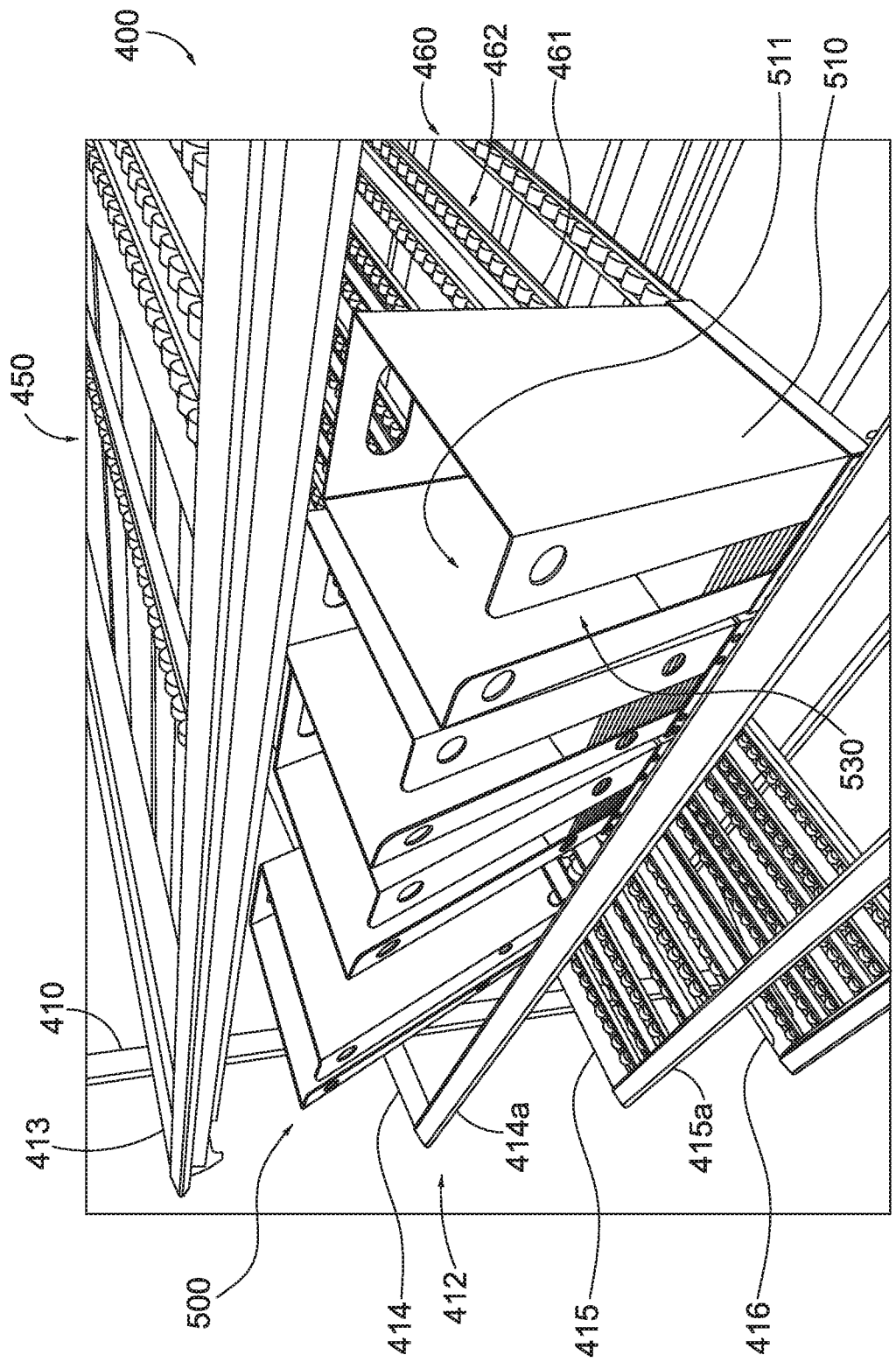
FIG. 7B is close up top and side perspective view of a portion of the high-density storage system of FIG. 7A, particularly showing a storage unit with a plurality of cartridges and a portion of a cartridge conveyance system, in accordance with aspects hereof.

FIGS. 7A and 7B depict one example of a high-density storage system 400 for use in the systems and processes disclosed herein. FIG. 7A depicts a front view illustrating a storage unit 410 and a plurality of cartridges 500 positioned thereon. FIG. 7B provides a close up and perspective view to illustrate detailed features of the high-density storage system 400, including a portion of the storage unit 410 coupled to a cartridge conveyance system 450. It should be understood that the high-density storage system 400 depicted in FIGS. 7A and 7B is one example high-density storage system and that other designs or modifications are also contemplated for use in the processes and systems described herein.

The storage unit 410 depicted in FIGS. 7A and 7B can include a plurality of shelves 412, such as the shelves 413, 414, 415, and 416. In aspects, the plurality of shelves 412 can be vertically spaced apart from one another so that each of the shelves, e.g., shelves 413, 414, 415, and 416, can accommodate one or more cartridges. As discussed above, in aspects, by having a vertical stack of horizontal rows of cartridges provides a high-density storage and presentation of articles, e.g., greeting cards, which can reduce the footprint required for presenting the articles, and also allow for increased selection rate or pick speed since the article picking device 200 may only have to move short distances to select the desired articles. It should be understood that the storage unit 410 can hold any number of cartridges and the number of cartridges depicted in FIGS. 7A and 7B is only an example, as some shelves are left bare to provide a detailed view of the storage unit 410 and/or the cartridge conveyance system 450.

As can be seen in the aspect depicted in FIG. 7B, the shelves 413, 414, 415, and 416 are positioned to be vertically spaced apart and provide a staggered, ladder-like configuration where the immediate lower shelf is extended out relative to the shelf immediate above. For example, as can be seen in FIG. 7, the edge 415a of shelf 415 is extended out past the edge 414a of the shelf 414 immediately above the shelf 415. In certain aspects, this staggered, ladder-like configuration can facilitate efficient access of the article picking device 200 to the articles present within each of the plurality of cartridges 500. In the same or alternative aspects, each of the plurality of cartridges 500 can be positioned such that a slot, e.g., the slot 530 of the cartridge 510, is adjacent the edge 414a where the article picking device 200 can access the interior portion 511 of the cartridge 510 with ease.

In certain aspects such as the aspect depicted in FIG. 7B, the high-density storage system 400 can be coupled to a cartridge conveyance system 450. In such aspects, the cartridge conveyance system 450 can include a plurality of tracks 460 that are coupled to the plurality of shelves 412 in order to transport cartridges to the respective shelf. For example, as can be seen in FIG. 7 the track 461 extends from the edge 414a of the shelf 414 and in a direction opposite the edge 414a. In such aspects, the track 461 can extend to a cartridge loading system or station where the cartridges are added to the track 461 (or any of the plurality of tracks 460) for delivery to the appropriate shelf.

In aspects, the cartridge conveyance system 450 can include a passive mechanism for transporting the cartridges to the shelves, such as utilizing rollers on the tracks and angling the tracks downward. For example, as can be seen in FIG. 7B, the edge 414a can be positioned lower than other portions of the track 461 and when a cartridge, e.g., cartridge 510, is loaded onto the track 461, the associated rollers 462 and angled orientation of the track 461 can facilitate the passive transport of the cartridge 416 to the shelf 414 towards the edge 414a.

FIGS. 8A-10D depict another example article picking device 800. In various aspects, the article picking device 800 can replace the article picking device 200 in the system 100 for selecting and packing articles discussed above, with respect to FIGS. 1-7B. For instance, in various aspects, the article picking device 800 can be coupled to a multi-axis movement mechanism, e.g., the multi-axis movement mechanism 300 depicted in FIG. 1, which can position the article picking device 800 to retrieve one or more articles from one of a plurality of cartridges, e.g., the plurality of cartridges 500 present in the high-density storage system 400 and the selected articles can be positioned on a conveyance system 600 for further downstream processing as discussed above with reference to FIGS. 1-7B.

In aspects, the article picking device 800 can include or be communicatively coupled to a computing device that receives orders for selecting and/or packing specific articles. In addition, such a computing device may also include other functions, such as the ability to communicate back to one or more upstream systems as discussed above with respect to the system 100 of FIGS. 1-7B.

Figure 8A:
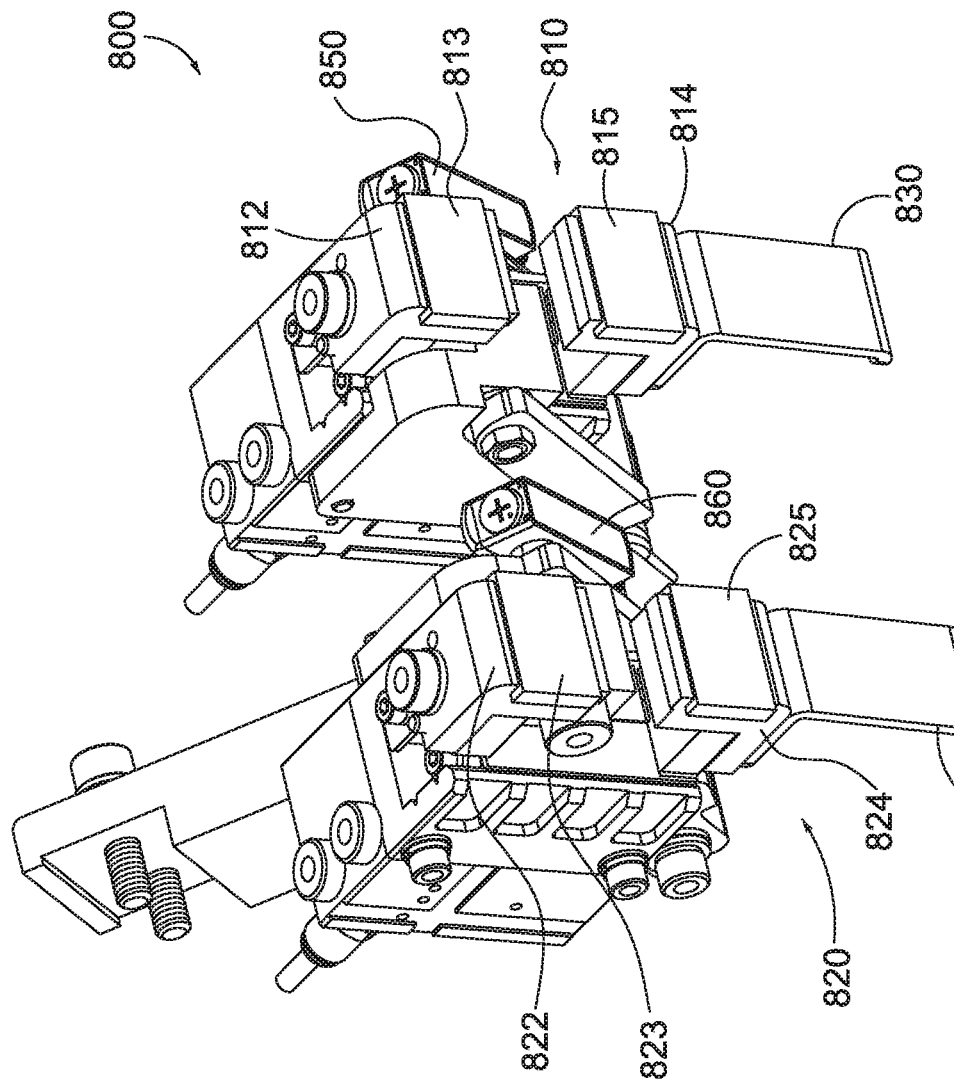
FIG. 8A is a top and side perspective view of another article picking device, in accordance with aspects hereof.
Figure 8B:
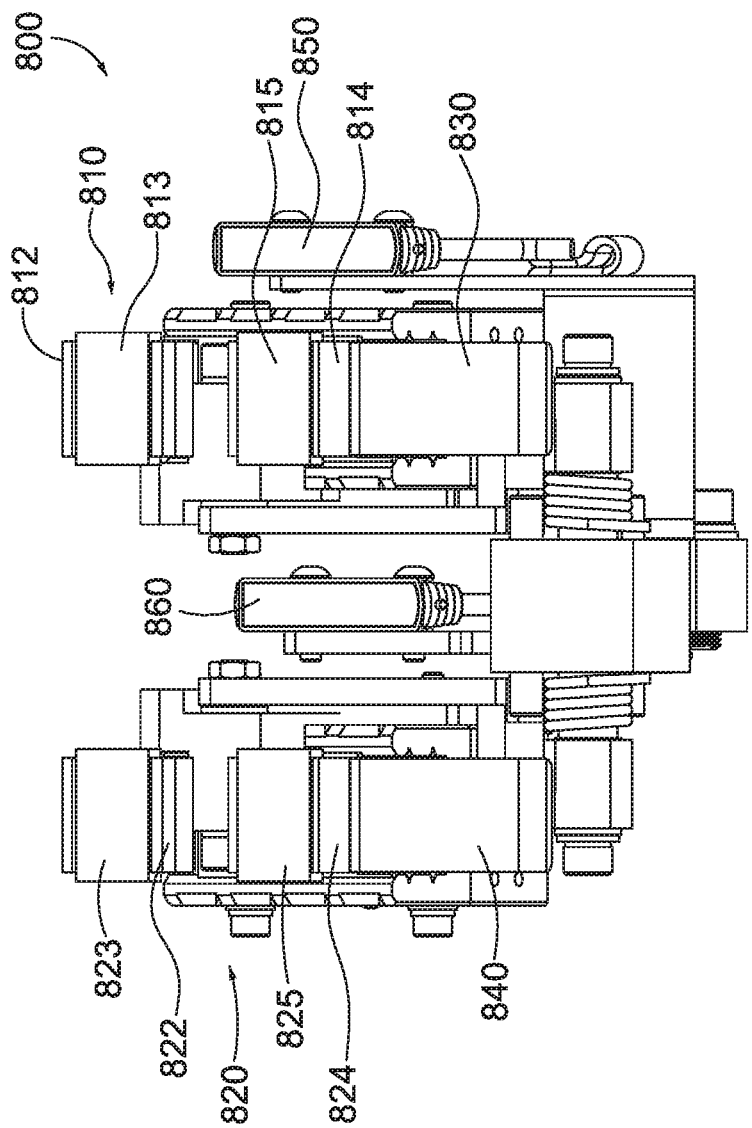
FIG. 8B is a front view of the article picking device of FIG. 8A, in accordance with aspects hereof.

In aspects, the article picking device 800 can include one or more gripping mechanisms which can be adapted to initially pick up, select, and/or engage an article, such as a greeting card or associated wrapping material. For instance, as can be seen in FIGS. 8A and 8B, the article picking device 800 can include a first gripping mechanism 810 and a second gripping mechanism 820 laterally spaced apart from one another, and such gripping mechanisms can be positioned, e.g., via a multi-axis movement mechanism, so that the gripping mechanisms are in contact with a selected article. At a high level, the first and second gripping mechanisms 810 and 820, respectively, can shift from an open configuration to a closed configuration to grab at least a portion of an article for securing the article for movement within the system for downstream processing.

As discussed above, in certain aspects, the articles described herein can include greeting cards. In such aspects, the lateral spacing between the first gripping mechanism 810 and the second gripping mechanism 820 is such that both the first gripping mechanism 810 and the second gripping mechanism 820 can contact a greeting card or cards, or a wrapper covering the card or cards. In such aspects, at least a portion of the first gripping mechanism 810 can spaced apart from at least a portion of the second gripping mechanism 820 by a distance that is of from 1 inch to 12 inches, from 2 inches to 10 inches, or from 3 inches to 9 inches.

Figure 9:
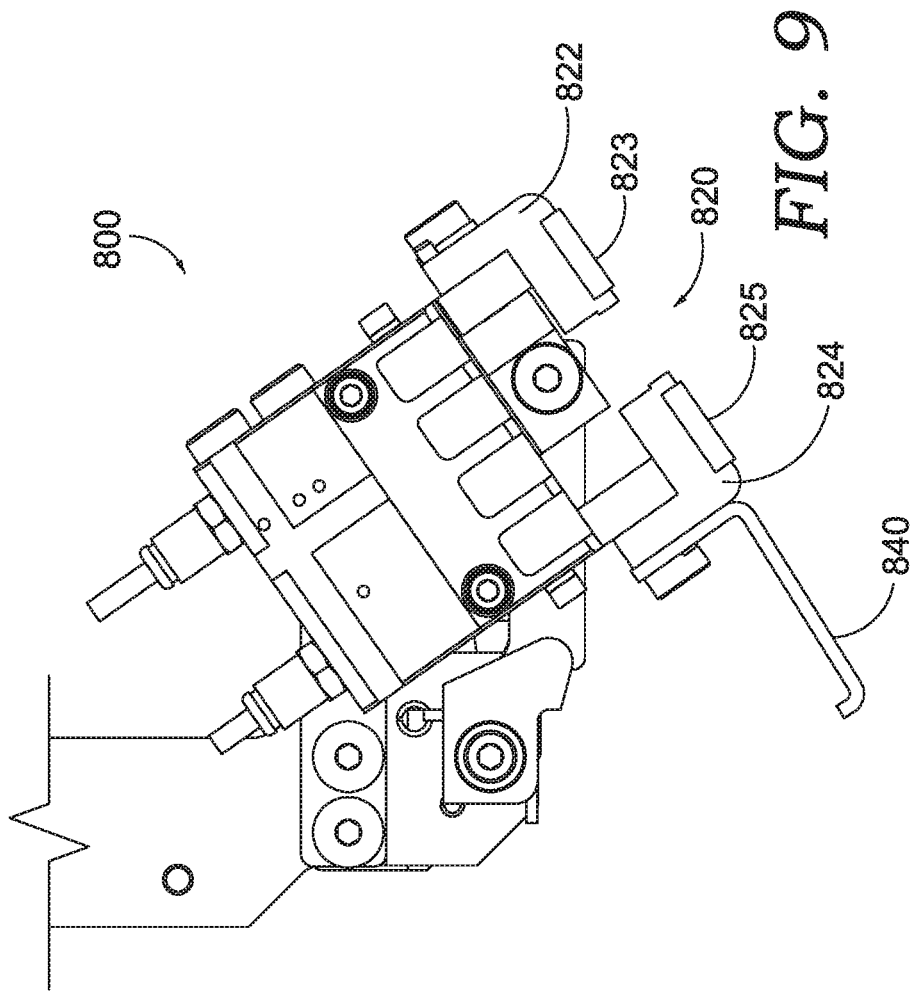
FIG. 9 is a side-view of the article picking device of FIGS. 8A and 8B, in accordance with aspects hereof.

As best seen in the aspect depicted in FIGS. 8A, 8B, and 9, the first gripping mechanism 810 and the second gripping mechanism 820 can each include a pair of spaced apart gripping members. For instance, the second gripping mechanism 820 can include a first gripping member 822 spaced apart from a second gripping member 824. In aspects, the first gripping member 822 and the second gripping member 824 can shift towards and away from one another in order to allow the second gripping mechanism 820 to grab or hold onto a portion of the article or a portion of an associated wrapping material. In the same or alternative aspects, the first gripping mechanism 810 can include a first gripping member 812 spaced apart from a second gripping member 814. In aspects, the first gripping member 812 and the second gripping member 814 can shift towards and away from one another in order to allow the first gripping mechanism 810 to grab or hold onto a portion of the article or a portion of an associated wrapping material. Below, the second gripping mechanism 820 is further described in operational detail. It should be understood, that the below features of the second gripping mechanism 820 may also apply to the first gripping mechanism 810, in certain aspects.

In aspects, the article picking device 800 can include one or more sensors to better facilitate the movement and/or functions of the article picking device 800. For example, in such aspects, one or more sensors can control the speed and/or orientation of the article picking device 800 as it approaches contact with an article or a cartridge containing one or more articles. In such aspects, any or all of the sensors discussed herein can be communicatively coupled to a computing device or other system that can receive information from any or all of these sensors and utilize such information to control the movement, speed, and/or orientation of a multi-axis movement mechanism and/or the article picking device 800.

In various aspects, the article picking device 800 can include one or more photoelectric sensors. FIGS. 8A and 8B depict two sensors 850 and 860. In certain aspects, the sensors 850 and/or 860 can include any or all of the features and parameters of the sensors 240 and/or 250 discussed above with respect to the article picking device 200 of FIGS. 1-7B. For example, in one or more aspects, the sensors 850 and/or 860 can be utilized to identify a portion of a cartridge 510, e.g., an edge of the cartridge, in order to ensure that the article picking device 200 is positioned appropriately for continued movement into and/or towards the cartridge for retrieval of an article and/or to detect the presence of the article inside of the cartridge.

In certain aspects, the article picking device 800 can include one or more stabilization members 830 and 840. In various aspects, the one or more stabilization members 830 and 840 can be adapted to stabilize the article once it is picked up by the article picking device 800 and is being transported from the cartridge to another location. For instance, in aspects, the one or more stabilization members 830 and 840 may aid in stabilizing the article from the forces and/or abrupt movements of the article caused by the acceleration and deceleration of the article as it is moved from the cartridge and delivered to the conveyance system.

As discuss above, the article picking device 800 can include one or more gripping mechanisms, e.g., the first gripping mechanism 810 and the second gripping mechanism 820, that can be utilized to secure or further secure a portion of the article or associated wrapping. Further, as discussed above with respect to the second gripping mechanism 820, the first gripping member 822 and the second gripping member 824 can shift towards and away from one another in order to allow the second gripping mechanism 820 to grab or hold onto a portion of the article or a portion of the associated wrapping material. In aspects, the shifting of the first gripping member 822 and the second gripping member 824 can include an open configuration, where the first gripping member 822 and the second gripping member 824 are spaced apart, and a closed configuration, where the first gripping member 822 and the second gripping member 824 have shifted towards one another, in order to hold onto or grab a portion of the wrapping material and/or article.

Figure 10A:
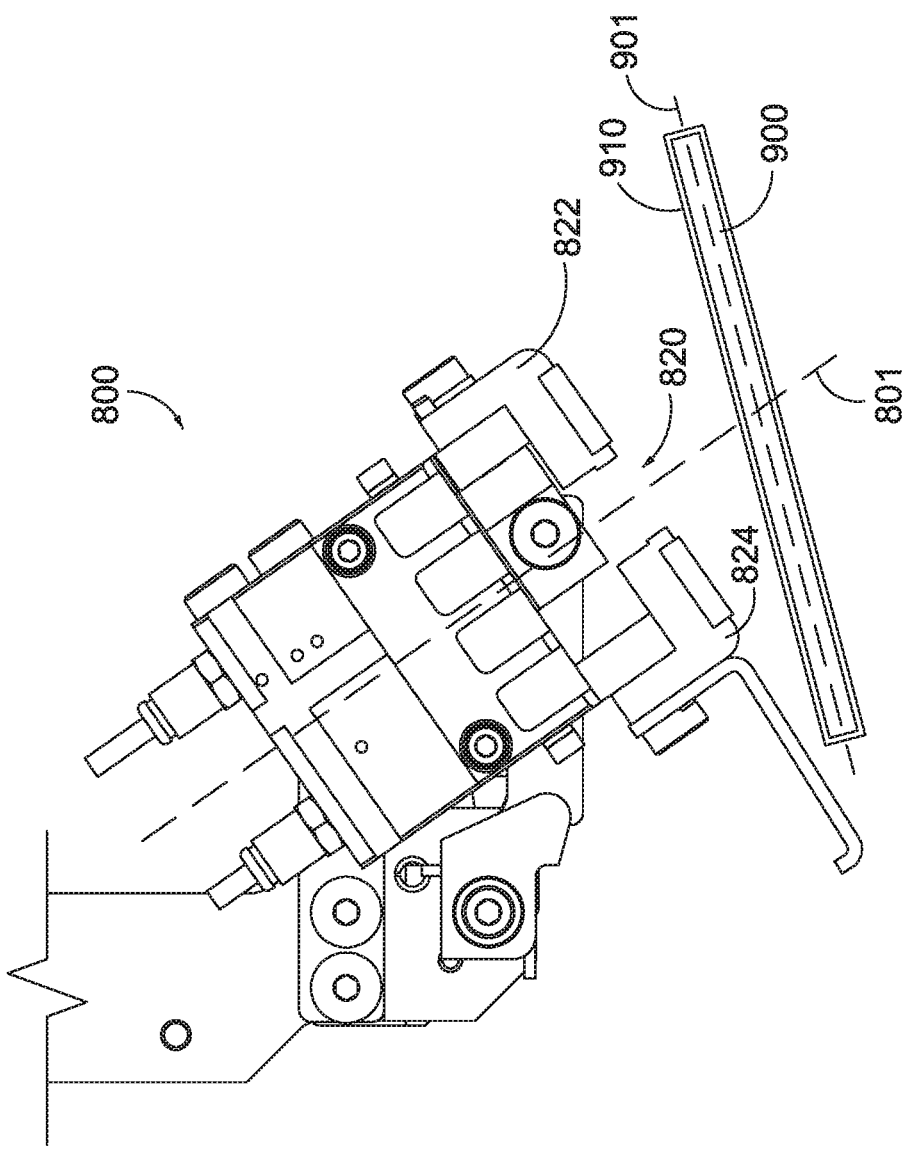
FIG. 10A is a side-view of the article picking device of FIG. 9 positioned adjacent an article, and positioned at a first orientation with respect to the article, in accordance with aspects hereof.
Figure 10B:
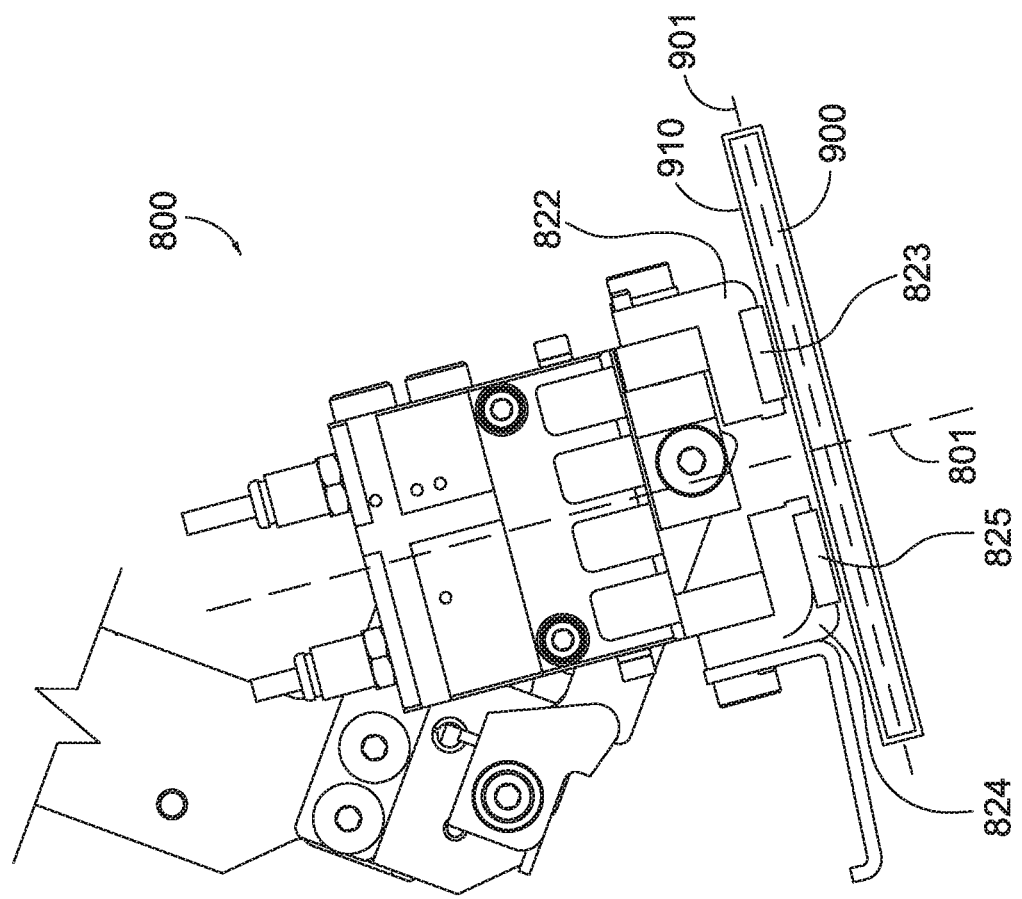
FIG. 10B is a side-view of the article picking device of FIG. 9, with at least a portion of one or more gripping mechanisms in contact with the article, where the article picking device is positioned at a second orientation with respect to the article, and where first and second gripping members of the one or more gripping mechanisms are in an open configuration, in accordance with aspects hereof.
Figure 10C:
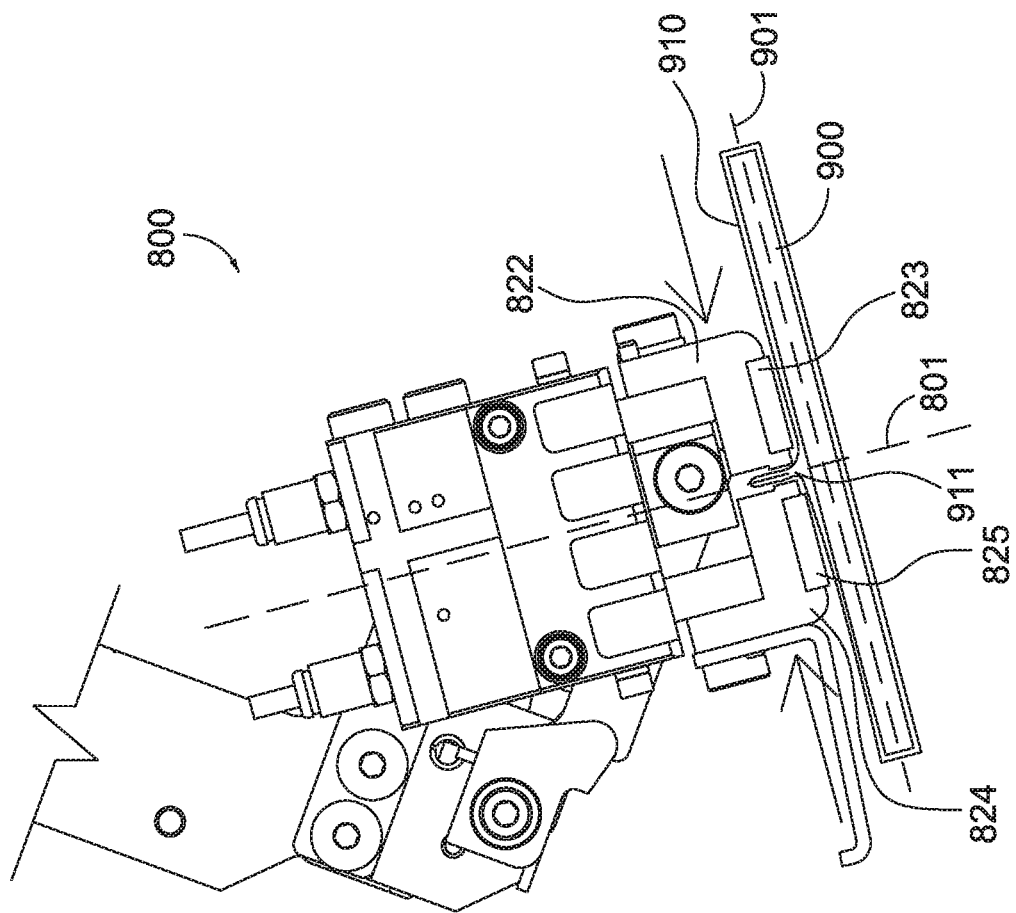
FIG. 10C is a side-view of the article picking device of FIG. 9, showing a portion of the article wrapping material positioned between at least the first and second gripping members of the one or more gripping mechanisms, and where the first and second gripping members of the one or more gripping mechanisms are in a closed configuration, in accordance with aspects hereof.
Figure 10D:
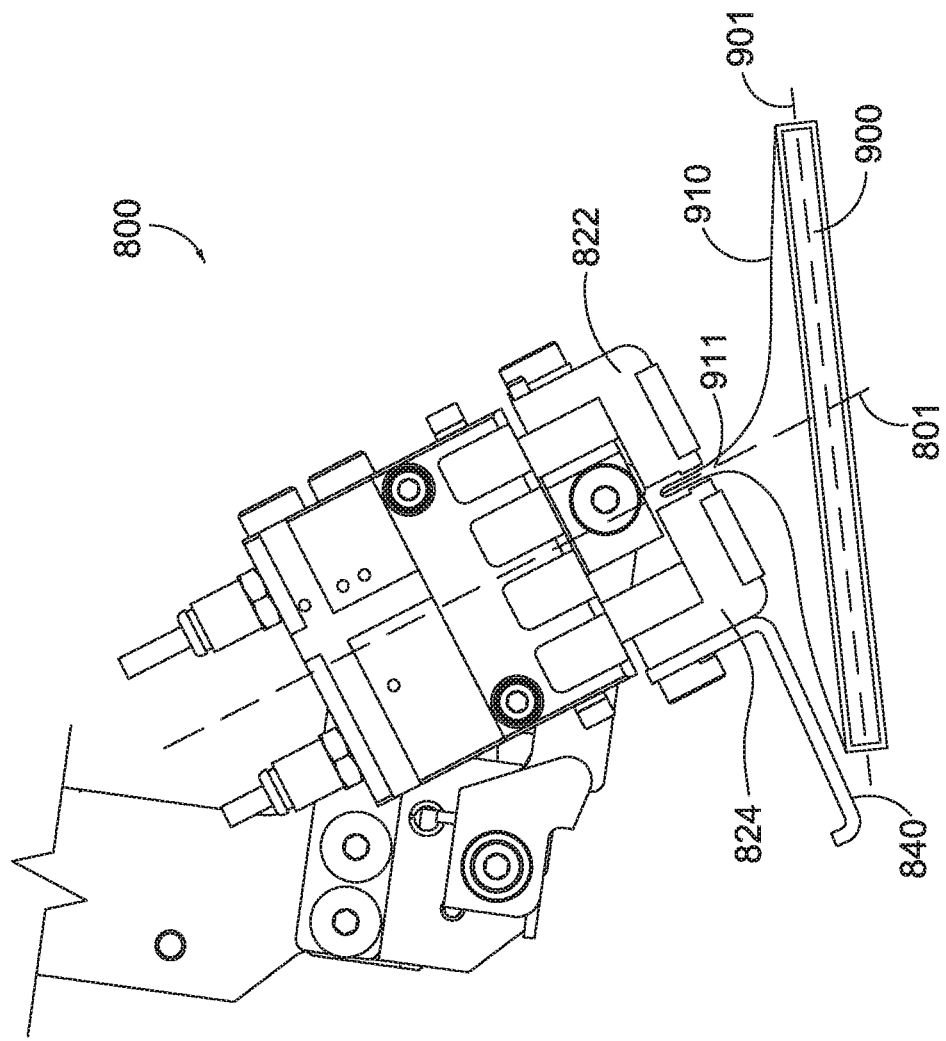
FIG. 10D is a side-view of the article picking device of FIG. 9, showing the article picking device pivoted back with respect to an axis of the article, in accordance with aspects hereof.

In the aspect depicted in FIGS. 8A-10B, at least the second gripping mechanism 820 is in the open configuration, while in the aspect depicted in FIGS. 10C and 10D at least the second gripping mechanism 820 is in the closed configuration. While not discussed further below, the first gripping mechanism 810 may function similarly, in aspects, to that of the second gripping mechanism 820 as discussed below. For example, in aspects, when the second gripping mechanism 820 is shifting between closed and open configurations, the first gripping mechanism 810 may also be similarly shifting between closed and open configurations, such that both first and second gripping mechanism 810 and 820, respectively, are either in a closed or an open configuration at the same time. In alternative embodiments, the first and second gripping mechanisms 810 and 820 may not be in the open or closed configuration at the same time or shifting between the two at the same time.

In aspects, the first gripping member 822 and the second gripping member 824 can shift between the open and closed configurations using any convenient movement mechanism, e.g., via a pneumatic mechanism. FIGS. 10A-10D will now be described in detail, which depict the article picking device 800 in operation as it approaches and picks up an article.

As best seen in FIG. 10A, the article picking device 800 is adjacent an article 900, e.g., a greeting card having a wrapping material 910 thereon. As can be seen by comparing FIGS. 10A and 10B, as the article picking device 800 contacts the article 900, the article picking device 800 pivots or rotates relative to the article 900 and/or relative to a portion of the multi-axis movement mechanism. This pivoting motion can be seen by comparing the relative relationship between the center axis 801 of the article picking device 800 and the center axis 901 of the article 900, in FIGS. 10A and 10B. In aspects, this pivoting motion upon contact with the article 900 can facilitate a better positioning of the article picking device 800 and/or the second gipping mechanism 820 with respect to the article 900, thereby allowing for efficient and effective gripping of the article 900 by the article picking device 800. In one aspect, a proximity sensor may be positioned on the article picking device 800 and/or a portion of the multi-axis movement mechanism, which may detect this pivoting motion of the article picking device 800. In such an aspect, the detection of this pivoting motion can communicate to a computing device or control unit that the article picking device 800 has engaged with an article.

In aspects, once the article picking device 800 contacts an article or is positioned adjacent an article, the first and second gripping members 822 and 824, respectively, can shift from an open configuration, as depicted in FIG. 10B, to a closed configuration, as depicted in FIG. 10C. In such aspects, the first and second gripping members 822 and 824, respectively, can move towards one another when shifting from the open to closed configuration and while contacting the wrapping material 910, which can result in a portion 911 of the wrapping material 910 being positioned between the first and second gripping members 822 and 824, respectively, thereby allowing the article picking device 800 to secure the article 900 for transport for further processing.

In aspects, each of the first gripping member 822 and the second gripping member 824 can include a contacting pad that can contact the article to provide increased friction to aid in securing the article thereto. For instance as best seen in FIGS. 8A and 8B, the first gripping member 822 can include a first contacting pad 823 and the second gripping member 824 can include a second contacting pad 825. In aspects, the first and second contacting pads 823 and 825, respectively, can include a rubber or other synthetic material that can aid in providing increased friction when contacting an article, e.g., so that the first and second gripping members 822 and 824, respectively, can move and/or secure to a portion of the article or associated wrapping material, as discussed herein. Further, in the aspect depicted in FIGS. 8A and 8B, the first and second gripping members 812 and 814, respectively, of the first gripping mechanism 810 can include respective contacting pads 813 and 815.

FIG. 10D depicts the article picking device 800 maintaining hold of the article 900, via at least the second gripping mechanism 820, with the article picking device 800 having pivoted back to its original position, as depicted in FIG. 10A. In this aspect depicted in FIG. 10D, the article picking device 800 may move and transport the article 900 to a desired location. In such aspects, the stabilization member 840 may contact the article 900 during movement to stabilize the position of the article 900.

Figure 11:
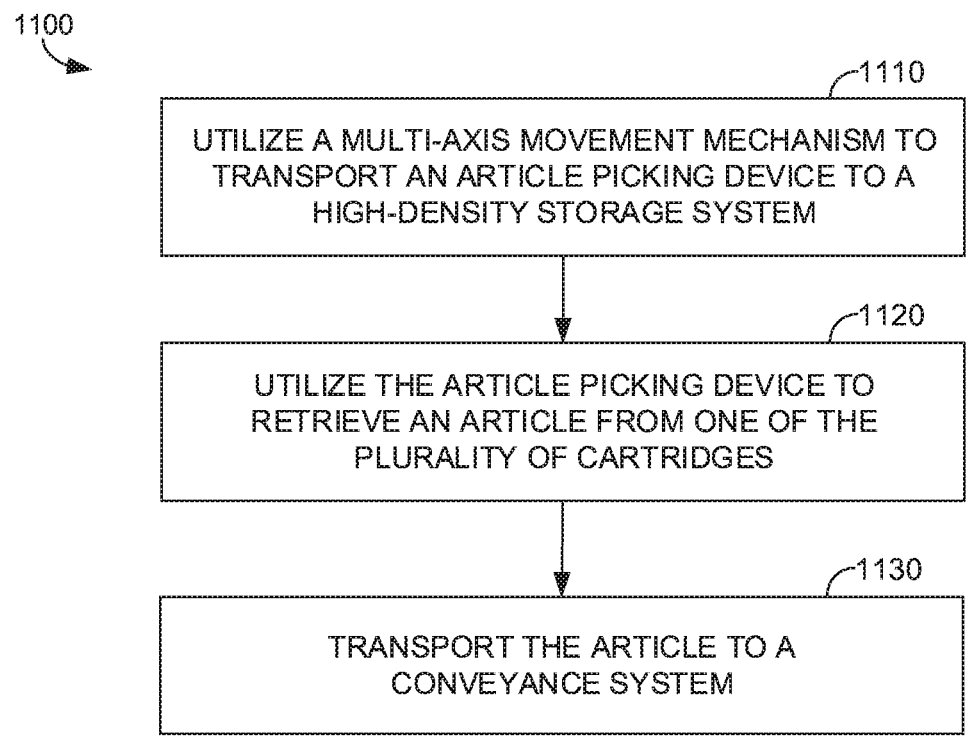
FIG. 11 is a flow diagram illustrating one method for selecting an article, in accordance with aspects hereof.

FIG. 11 depicts a flow diagram of a method 1100 for selecting and packing articles. In aspects, the articles can include greeting cards. In certain aspects, the method of selecting and packing articles can be performed in order to select, pick, and pack wholesale greeting cards for a retail order. In one or more aspects, the articles or greeting cards can include a wrapping material surrounding the greeting cards or articles.

The method 1100 can include a step 1110 of utilizing a multi-axis movement mechanism to transport an article picking device to a high-density storage system. In one aspect, the high-density storage system includes a plurality of cartridges, where each of the plurality of cartridges contains a plurality of articles. In aspects, the multi-axis movement mechanism, the article picking device, and the high-density storage system can include any or all of the properties of the multi-axis movement mechanism 300, the article picking device 200 and/or the article picking device 800, and the high-density storage system 400, respectively, discussed in detail above with reference to one or more of FIGS. 1-10D.

At step 1120, the method 1100 includes utilizing the article picking device to retrieve an article from one of the plurality of cartridges. In certain aspects, at least a portion of the article picking device can be inserted into an inner portion of the cartridge, e.g., though a slot 530 depicted in FIG. 6. In certain aspects, the retrieving can include temporarily securing a portion of a wrapper of the article to the article picking device, e.g., by utilizing vacuum pressure applied to a first portion of the wrapper via first and second suction mechanisms of the article picking device, mechanically pinching a second portion of the wrapper via first and second gripping members of the article picking device, or a combination thereof. In certain aspects, the retrieving may not include the use of vacuum pressure and may include mechanically pinching a second portion of the wrapper via first and second gripping members of the article picking device, such as that described above with reference to FIGS. 8A-10D.

At step 1130, the method 1100 includes transporting the article to a conveyance system. In aspects, the article can be transported to the conveyance system via the article picking device and the multi-axis movement mechanism. In certain aspects, the selected article may be placed into a shipping container or other type of container and combined with other selected articles prior to, or subsequent to, transporting to the conveyance system.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

The invention claimed is:

1. A system for selecting and packing articles, the system comprising:
   a multi-axis movement mechanism;
   an article picking device coupled to said multi-axis movement mechanism, wherein the article picking device includes a first gripping mechanism,
      wherein the first gripping mechanism includes (1) a first gripping member that includes a first planar surface and a first face orthogonal to said first planar surface and (2) a second gripping member that includes a second planar surface and a second face that is orthogonal to said second planar surface,
      wherein the first and second faces are spaced apart such that there is a first gap of no more than two inches between said first and second faces when the first gripping mechanism is in an open configuration, but the first gap is closed when the first gripping mechanism is in a closed configuration;
      wherein the first and second planar surfaces are coplanar when said gripping mechanism is in the open configuration and when gripping mechanism is in the closed configuration; and
   a storage system that includes a first cartridge that is adapted to hold a first article and a plurality of second articles, wherein the article picking device is adapted to retrieve the first article from the first cartridge via the multi-axis movement mechanism by utilizing the first gripping mechanism to grasp a wrapping of the first article when the first gripping mechanism is in the closed configuration, wherein the wrapping is physically separate from the first article.

2. The system according to claim 1, wherein the system is adapted to retrieve the first article from the first cartridge and transport the article to a conveyance system in ten seconds or less.

3. The system of claim 1, wherein the article picking device further comprises a second gripping mechanism laterally spaced apart from the first gripping mechanism,
   wherein the second gripping mechanism includes (1) a third gripping member that includes a third planar surface and a third face orthogonal to the third planar surface and (2) a fourth gripping member that includes a fourth planar surface and a fourth face that is orthogonal to the second planar surface,
   wherein the third and fourth planar surfaces are substantially coplanar,
   wherein the third and fourth faces are spaced apart such that there is a second gap that is not more than two inches between the third and fourth faces when the second gripping mechanism is in an open configuration, but the second gap is closed when the second gripping mechanism is in a closed configuration, and
   wherein the first, second, third, and forth planar surfaces are all substantially coplanar.

4. The system according to claim 1, wherein the storage system comprises a storage unit, the storage unit having a plurality of shelves vertically spaced apart from one another, and wherein each of the plurality of shelves is adapted to hold a portion of a plurality of cartridges in addition to the first cartridge.

5. The system according to claim 4, wherein each of the plurality of shelves is coupled to a cartridge conveyance system, and wherein the cartridge conveyance system comprises a plurality of tracks adapted to transport one or more cartridges to the plurality of shelves.

6. An article picking device, the article picking device comprising:
   a first gripping mechanism that includes (1) a first gripping member having a first face and (2) a second gripping member having a second face, wherein the first face of the first gripping member is positioned opposite the second face of the second gripping member,
      wherein the first gripping mechanism is adapted to transition from an open configuration to a closed configuration, wherein the open configuration is characterized by the first face being laterally spaced from the second face by fewer than two inches,
      wherein the closed configuration is characterized by the first and second gripping members grasping a first article that is picked such that at least a portion of the first face is in contact with the first article and at least a portion of the second face is simultaneously in contact with the first article,
      wherein at least a portion of the first and second gripping members laterally transition in a common plane when the first gripping mechanism transitions from the open configuration to the closed configuration; and
   wherein the first gripping member includes a first stabilization member that extends laterally from the first gripping member and is adapted to stabilize the first article when it is picked; and
   one or more sensors operable to transition the first gripping mechanism from the open configuration to the closed configuration.

7. The article picking device according to claim 6, further comprising:
   a second gripping mechanism that includes (1) a third gripping member having a third face and (2) a fourth gripping member having a fourth face, wherein the third face of the third gripping member is positioned opposite the second face of the second gripping member,
   wherein the second gripping mechanism is adapted to transition from an open configuration to a closed configuration, wherein the open configuration is characterized by a third face being laterally spaced from the fourth face by fewer than two inches,
   wherein the closed configuration is characterized by the third and fourth gripping members grasping the first article that is picked such that at least a portion of the third face is in contact with the first article and at least a portion of the fourth face is simultaneously in contact with the first article, wherein at least a portion of the second and third gripping members laterally transition in a common plane when the first gripping mechanism transitions from the open configuration to the closed configuration.

8. The article picking device according to claim 6, wherein the one or more sensors comprise one or more of a fixed field sensor, a reflective sensor, or a proximity sensor.

9. The article picking device according to claim 6, wherein the article picking device further comprises one or more suction mechanisms, and wherein the one or more suction mechanisms comprises a first suction mechanism and a second suction mechanism, wherein a center of the first suction mechanism is spaced apart from a center of the second suction mechanism by a distance that is of from 1 inch to 12 inches.

\* \* \* \* \*